US010910635B2

(12) United States Patent
Otohata et al.

(10) Patent No.: US 10,910,635 B2
(45) Date of Patent: Feb. 2, 2021

(54) METHOD FOR MANUFACTURING ELECTRODE FOR SECONDARY BATTERY AND METHOD FOR MANUFACTURING SECONDARY BATTERY

(71) Applicant: NEC CORPORATION, Tokyo (JP)

(72) Inventors: Makihiro Otohata, Tokyo (JP); Noboru Yoshida, Tokyo (JP)

(73) Assignee: NEC CORPORATION, Tokyo (JP)

( * ) Notice: Subject to any disclaimer, the term of this patent is extended or adjusted under 35 U.S.C. 154(b) by 141 days.

(21) Appl. No.: 16/188,522

(22) Filed: Nov. 13, 2018

(65) Prior Publication Data
US 2019/0165368 A1 May 30, 2019

(30) Foreign Application Priority Data

Nov. 24, 2017 (JP) ................................. 2017-225638

(51) Int. Cl.
*H01M 4/139* (2010.01)
*H01M 4/04* (2006.01)
(Continued)

(52) U.S. Cl.
CPC ......... *H01M 4/139* (2013.01); *H01M 4/0404* (2013.01); *H01M 4/0471* (2013.01);
(Continued)

(58) Field of Classification Search
CPC .. H01M 4/139; H01M 4/0404; H01M 4/0471; H01M 4/366; H01M 10/058; H01M 10/0525
See application file for complete search history.

(56) References Cited

U.S. PATENT DOCUMENTS

2005/0186474 A1* 8/2005 Jiang .................... H01M 4/505
429/209

FOREIGN PATENT DOCUMENTS

JP        1125956 A     1/1999
JP       11339772 A    12/1999
(Continued)

OTHER PUBLICATIONS

Kyoichi Saito, "JP2000331675—Manufacture of Secondary Battery Electrode and Manufacture of Secondary Battery" translation, original published 2000, translated via google Apr. 28, 2020 (Year: 2000).*

(Continued)

*Primary Examiner* — Jimmy Vo
(74) *Attorney, Agent, or Firm* — Sughrue Mion, PLLC

(57) ABSTRACT

A secondary battery electrode manufacturing method comprises applying a slurry for a first layer to a current collector, applying a slurry for a second layer to the slurry for the first layer before the slurry for the first layer dries, and drying the slurries to obtain a laminated structure in which the first and second layers are laminated in this order on the current collector. A first and second binder or thickener for the respective slurries are selected such that when viscosities are measured for a first solution including solvent and the first binder or thickener dissolved in the solvent in a specific mass ratio and a second solution including a solvent and the second binder or thickener dissolved in the solvent at the same mass ratio under the same conditions, the viscosity of the first solution is higher than the viscosity of the second solution.

15 Claims, 11 Drawing Sheets

(51) Int. Cl.
*H01M 10/058* (2010.01)
*H01M 4/36* (2006.01)
*H01M 10/0525* (2010.01)

(52) U.S. Cl.
CPC ......... *H01M 4/366* (2013.01); *H01M 10/058* (2013.01); *H01M 10/0525* (2013.01)

(56) References Cited

FOREIGN PATENT DOCUMENTS

| JP | 2000123823 A | 4/2000 |
|----|--------------|--------|
| JP | 2000331675 A | 11/2000 |
| JP | 3622383 B2 | 2/2005 |
| JP | 2011159407 A | 8/2011 |

OTHER PUBLICATIONS

International Search Report and Written Opinion dated Feb. 20, 2019 from the International Bureau in counterpart International application No. PCT/JP2018/041942.

* cited by examiner

METHOD FOR MANUFACTURING ELECTRODE FOR SECONDARY BATTERY AND METHOD FOR MANUFACTURING SECONDARY BATTERY

TECHNICAL FIELD

This application is based upon and claims the benefit of priority from Japanese patent application No. 2017-225638, filed on Nov. 24, 2017, the disclosure of which is incorporated herein in its entirety by reference.

The present invention relates to a method for an electrode used as a positive electrode and a negative electrode of a secondary battery.

BACKGROUND ART

Secondary batteries are widely used as power sources for portable electronic devices such as smart phones, tablet computers, notebook computers, digital cameras, and the like. In addition, secondary batteries have been expanding their application as power sources for electric vehicles and household power supplies. Among them, since lithium ion secondary batteries are high in energy density and light in weight, they are indispensable energy storage devices for current life.

A conventional battery including a secondary battery has a structure in which a positive electrode and a negative electrode, which are electrodes, are opposed to each other with a separator interposed therebetween. The positive electrode and the negative electrode each have a sheet-like current collector and active material layers formed on both sides of the current collector. The separator serves to prevent a short circuit between the positive electrode and the negative electrode and to effectively move ions between the positive electrode and the negative electrode. Conventionally, a polyolefin system microporous separator made of polypropylene or polyethylene material is mainly used as the separator. However, the melting points of polypropylene and polyethylene materials are generally 110° C. to 160° C. Therefore, when a polyolefin system separator is used for a battery with a high energy density, the separator melts at a high temperature of the battery, and a short circuit may occur between the electrodes in a large area, and the battery may smoke and fire.

Therefore, in order to improve the safety of the secondary battery, the following techniques are known. Patent Literature 1 (Japanese Patent No. 3622383) discloses a method for an electrode of a secondary battery having a configuration in which an electrode material layer and a protective layer are laminated by applying a liquid for the electrode material layer and a liquid for the protective layer simultaneously on a current collector and drying the liquids.

CITATION LIST

Patent Literature

Patent Literature 1: Japanese Patent No. 3622383

SUMMARY OF INVENTION

Technical Problem

However, according to the technique described in Patent Literature 1, since the liquid for the insulating layer is applied before the liquid for the active material layer is dried, both of the liquids are mixed in the vicinity of the interface between the active material layer and the insulating layer, and a mixed portion of the active material layer and the insulating layer is form at the interface. Local mixing of both layers is desirable for improving the adhesion of both layers. However, significant mixing may result in a decrease in charge and discharge capacity, an increase in battery resistance, a decrease in insulation effect, and the like.

An example object of the present invention is to provide a method for manufacturing an electrode for a secondary battery and a method for manufacturing a secondary battery, in which the electrode has a first layer and a second layer laminated on a current collector, capable of manufacturing the electrode without deteriorating the insulating effect when used for the battery while suppressing mixing of the first layer and the second layer when the second layer is applied before drying of the first layer.

Solution to Problem

A method for manufacturing an electrode for a secondary battery according to an example aspect of the present invention is a method for manufacturing an electrode used as a positive electrode and a negative electrode of a secondary battery, the method comprising:

applying a slurry for a first layer to a surface of a current collector;

applying a slurry for a second layer to the slurry for the first layer before the slurry for the first layer is dried; and drying the slurries for the first layer and the second layer after applying the slurries for the first layer and the second layer to obtain a laminated structure in which the first layer and the second layer are laminated in this order on the current collector;

wherein a first binder or thickener for the slurry for the first layer and a second binder or thickener for the slurry for the second layer are selected such that when viscosities are measured for a first solution including solvent and the first binder or thickener dissolved in the solvent in a specific mass ration and a second solution including a solvent and the second binder or thickener dissolved in the solvent at the same mass ration as the mass ration of the first binder or thickener under the same conditions, the viscosity of the first solution is higher than the viscosity of the second solution.

According to another example aspect of the present invention, a method for manufacturing an electrode for a secondary battery is a method for manufacturing an electrode used as a positive electrode and a negative electrode of a secondary battery, the method comprising;

applying a slurry for a first layer to a surface of current collector;

applying a slurry for a second layer to the slurry for the first layer before the slurry for the first layer is dried; and drying the slurries for the first layer and the second layer after applying the slurries for the first layer and the second layer to obtain a laminated structure in which the first layer and the second layer are laminated in this order on the current collector;

wherein a molecular weight of a first binder or thickener used in the slurry for the first layer is larger than that of a second binder or thickener used in the slurry for the second layer.

Advantageous Effects of Invention

According to the present invention, the electrode having a structure in which a first layer and a second layer are laminated on a current collector can be efficiently manufactured without deteriorating battery characteristics when used as a battery while suppressing mixing at the interface between the first layer and the second layer even if the second layer is applied before drying of the first layer.

DESCRIPTION OF EXAMPLE EMBODIMENTS

Figure 1:
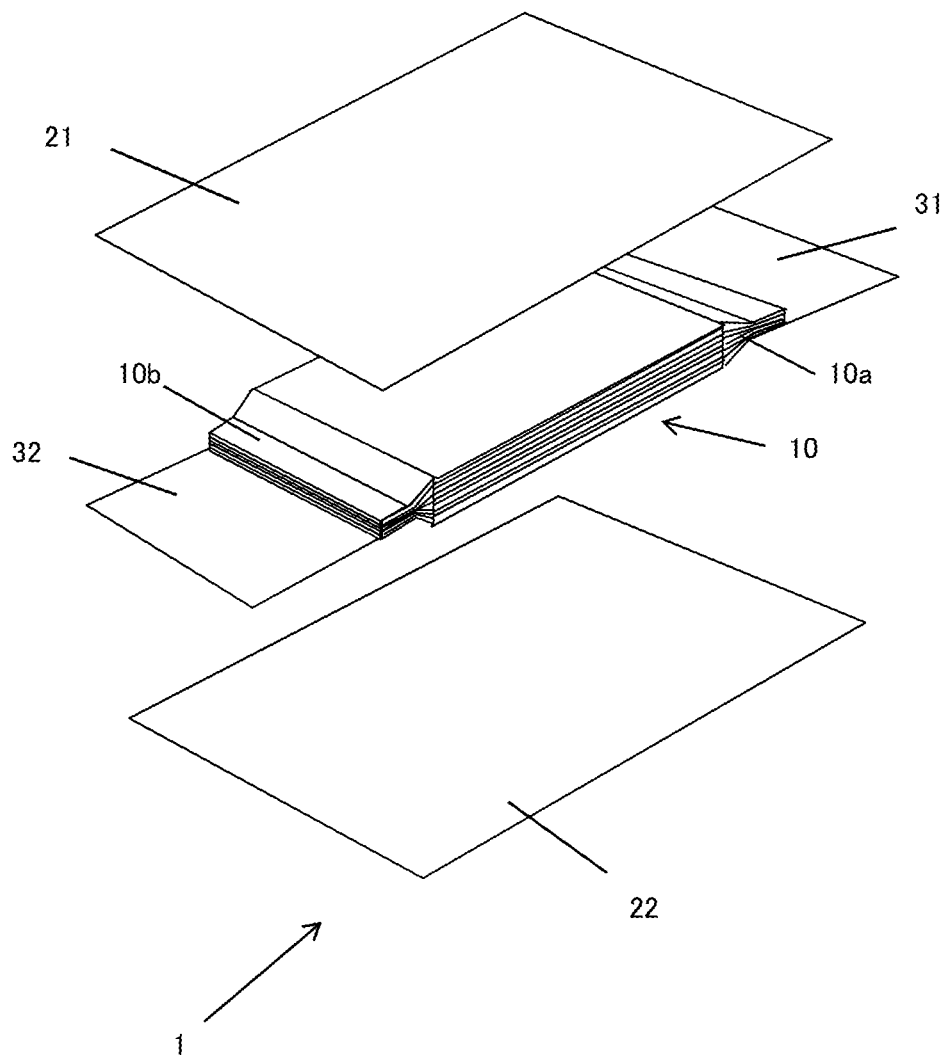
FIG. 1 is an exploded perspective view of a battery according to one embodiment of the present invention.

Referring to FIG. 1, an exploded perspective view of a battery 1 according to one example embodiment of the present invention is shown, which comprises a battery element 10 and a casing enclosing the battery element 10 together with an electrolytic solution. The casing has casing members 21, 22 that enclose the battery element 10 from both sides in the thickness direction thereof and seal outer circumferential portions thereof to thereby seal the battery element 10 and the electrolytic solution. A positive electrode terminal 31 and a negative electrode terminal 32 are respectively connected to the battery element 10 with protruding part of them from the casing.

Figure 2:
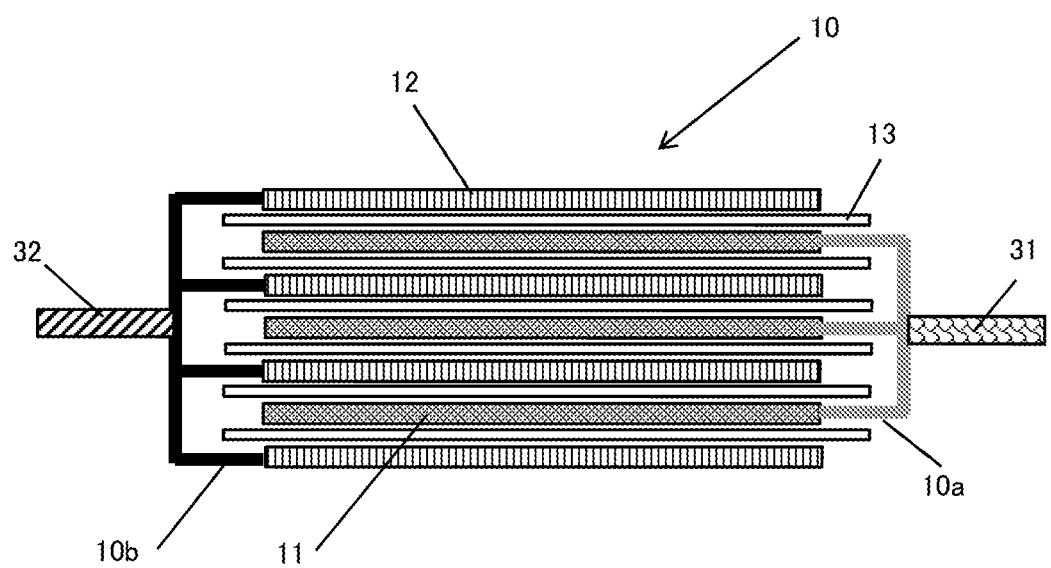
FIG. 2 is a schematic cross-sectional view of an battery element shown in FIG. 1.

As shown in FIG. 2, the battery element 10 has a configuration in which a plurality of positive electrodes 11 and a plurality of negative electrodes 12 are disposed so as to be alternately positioned. Between the positive electrode 11 and the negative electrode 12, a separator 13 for preventing short-circuiting between the positive electrode 11 and the negative electrode 12 while securing ionic conduction between the positive electrode 11 and the negative electrode 12 may be arranged. However, the separator is not essential in the present example embodiment.

Figure 3:
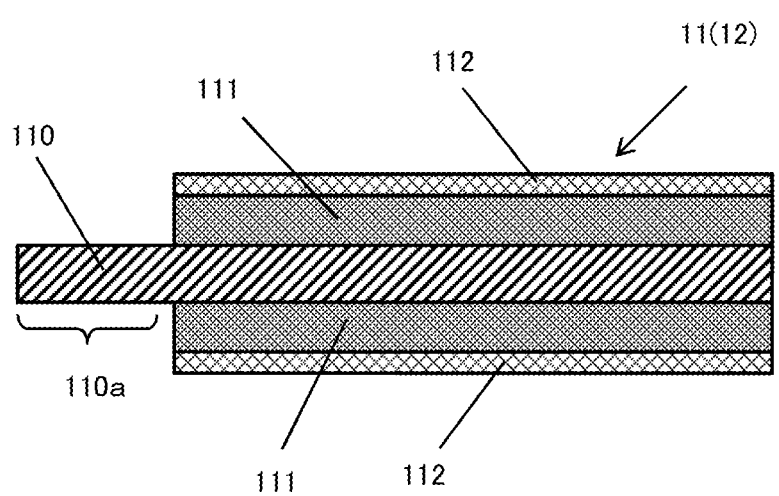
FIG. 3 is a schematic cross-sectional view for explaining the structures of the positive electrode and the negative electrode shown in FIG. 2.

Structures of the positive electrode 11 and the negative electrode 12 will be described with further reference to FIG. 3. In the structure shown in FIG. 3, the positive electrode 11 and the negative electrode 12 are not particularly distinguished, but the structure is applicable to both the positive electrode 11 and the negative electrode 12. The positive electrode 11 and the negative electrode 12 (collectively referred to as "electrode" in a case where these are not distinguished) include a current collector 110 which can be formed of a metal foil, an active material layer 111 formed on one or both surfaces of the current collector 110. The active material layer 111 is preferably formed in a rectangular shape in plan view, and the current collector 110 has a shape having an extended portion 110a extending from a region where the active material layer 111 is formed.

The extended portion 110a of the positive electrode 11 and the extended portion 110a of the negative electrode 12 are formed at positions not overlapping each other in a state where the positive electrode 11 and the negative electrode 12 are laminated. However, the extension portions 110a of the positive electrodes 11 are positioned to overlap with each other, and the extension portions 110a of the negative electrodes 12 are also similar to each other. With such arrangement of the extended portions 110a, in each of the plurality of positive electrodes 11, the respective extended portions 110a are collected and welded together to form a positive electrode tab 10a. Likewise, in the plurality of negative electrodes 12, the respective extended portions 110a are collected and welded together to form a negative electrode tab 10b. A positive electrode terminal 31 is electrically connected to the positive electrode tab 10a and a negative electrode terminal 32 is electrically connected to the negative electrode tab 10b.

At least one of the positive electrode 11 and the negative electrode 12 further includes an insulating layer 112 formed on the active material layer 111. The insulating layer 112 is formed in a region where the active material layer 111 is not exposed in plan view and may be formed so as to cover a part of the extension portion 110a. In the case where the active material layer 111 is formed on both surfaces of the current collector 110, the insulating layer 112 may be formed on both of the active materials 111, or may be formed only on one of the active materials 111.

Figure 4A:
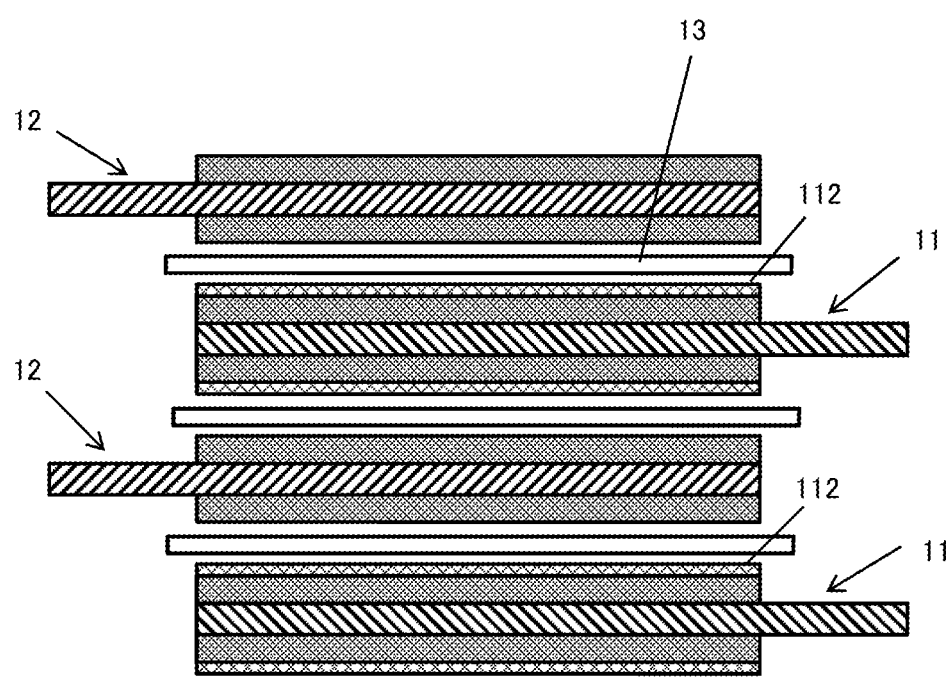
FIG. 4A is a cross-sectional view showing an example of arrangement of the positive electrode and the negative electrode in the battery element.
Figure 4B:
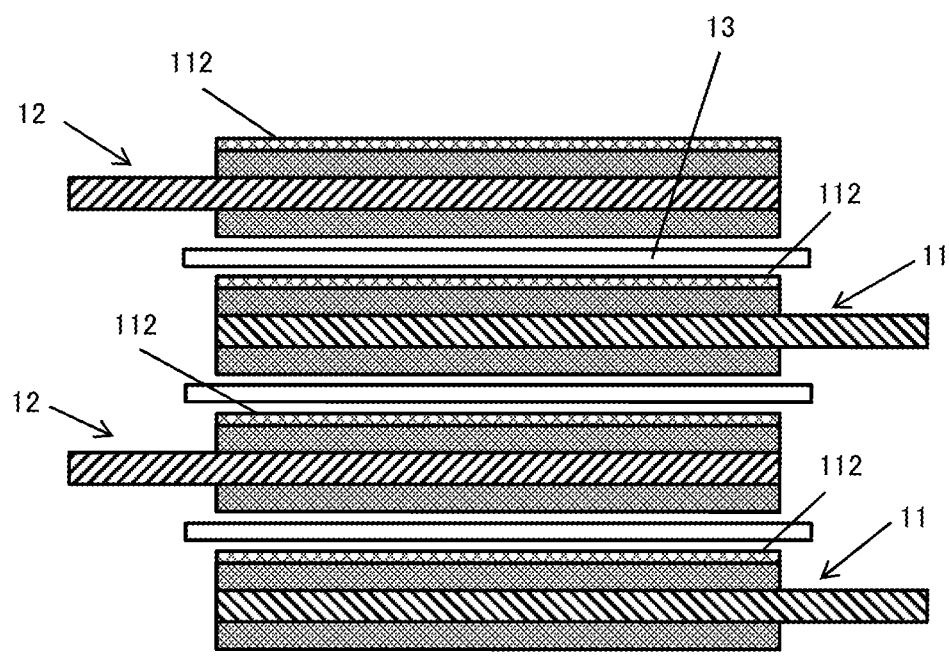
FIG. 4B is a cross-sectional view showing another example of arrangement of the positive electrode and the negative electrode in the battery element.
Figure 4C:
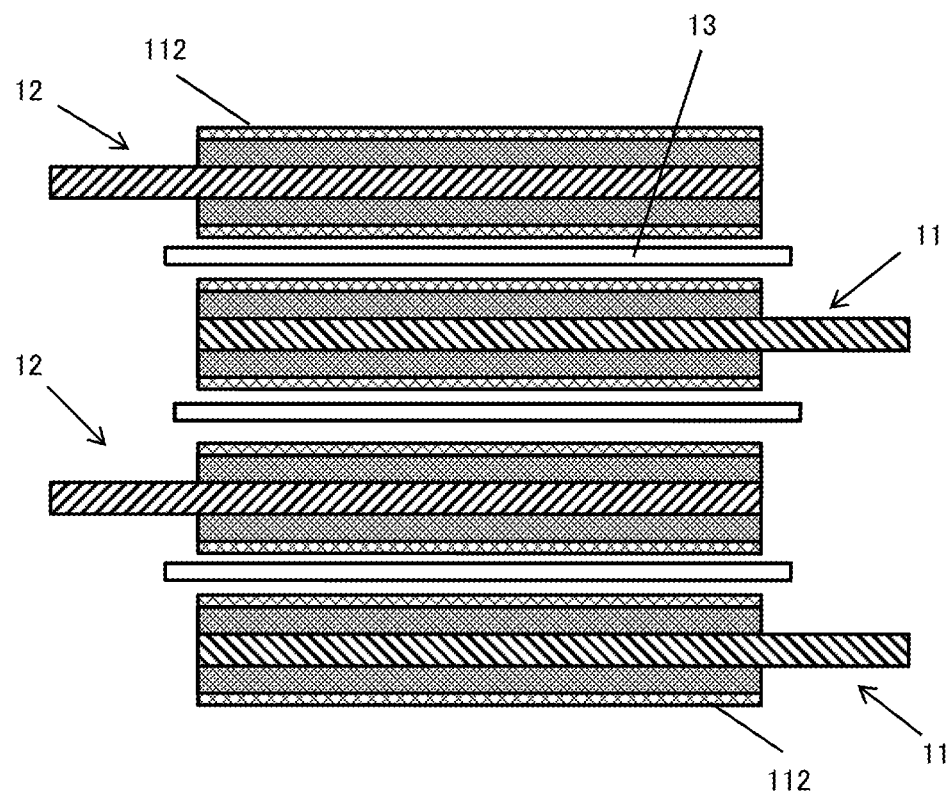
FIG. 4C is a cross-sectional view showing still another example of arrangement of the positive electrode and the negative electrode in the battery element.

Some examples of the arrangement of the positive electrode 11 and the negative electrode 12 having such a structure are shown in FIGS. 4A to 4C. In the arrangement shown in FIG. 4A, the positive electrode 11 having the insulating layers 112 on both sides and the negative electrode 12 not having the insulating layer are alternately laminated. In the arrangement shown in FIG. 4B, the positive electrode 11 and the negative electrode 12 having the insulating layer 112 on only one side are alternately laminated in such a manner that the respective insulating layers 112 do not face each other. In the arrangement shown in FIG. 4C, the positive electrode 11 having the insulating layers 112 on both sides and the negative electrode 12 having the insulating layers 112 on both sides are alternately laminated.

In the structures shown in FIGS. 4A to 4C, since the insulating layer 112 exists between the positive electrode 11 and the negative electrode 12, the separator 13 can be omitted. Although the positive electrode 11 and the negative electrode 12 are formed into a predetermined shape by punching or the like, large burrs sometimes occur at this time. Therefore, in the case where the separator is not provided, in order to prevent a short circuit between the positive electrode 11 and the negative electrode 12 by such a large burr, it is preferable that the positive electrode 11 and the negative electrode 12 have insulating layers 112 on both sides respectively.

The structure and arrangement of the positive electrode 11 and the negative electrode 12 are not limited to the above examples and various modifications are possible as long as the insulating layer 112 is provided on at least one surface of at least one of the positive electrode 11 and the negative electrode 12 and the positive electrode 11 and the negative electrode 12 are arranged such that the insulating layer 112 exists between the positive electrode 11 and the negative electrode 12. For example, in the structures shown in FIGS. 4A and 4B, the relationship between the positive electrode 11 and the negative electrode 12 can be reversed.

Since the battery element 10 having a planar laminated structure as illustrated has no portion having a small radius of curvature (a region close to a winding core of a winding structure), the battery element 10 has an advantage that it is less susceptible to the volume change of the electrode due to charging and discharging as compared with the battery element having a wound structure. That is, the battery element having a planar laminated structure is effective for an battery element using an active material that is liable to cause volume expansion.

Figure 5:
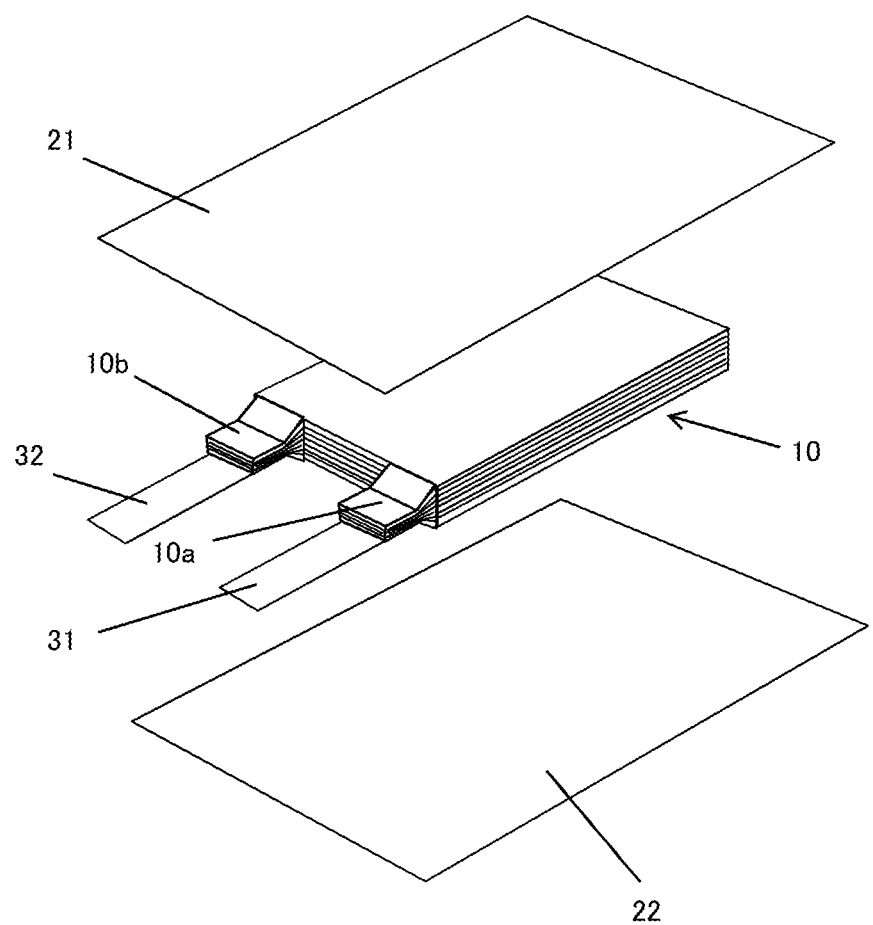
FIG. 5 is an exploded perspective view of a secondary battery according to another embodiment of the present invention.

In the example embodiment shown in FIGS. 1 and 2, the positive electrode terminal 31 and the negative electrode terminal 32 are drawn out in opposite directions, but the directions in which the positive electrode terminal 31 and the negative electrode terminal 32 are drawn out may be arbitrary. For example, as shown in FIG. 5, the positive electrode terminal 31 and the negative electrode terminal 32 may be drawn out from the same side of the battery element 10. Although not shown, the positive electrode terminal 31 and the negative electrode terminal 32 may also be drawn out from two adjacent sides of the battery element 10. In both of the above case, the positive electrode tab 10a and the negative electrode tab 10b can be formed at positions corresponding to the direction in which the positive electrode terminal 31 and the negative electrode terminal 32 are drawn out.

Furthermore, in the illustrated example embodiment, the battery element 10 having a laminated structure having a plurality of positive electrodes 11 and a plurality of negative electrodes 12 is shown. However, the battery element having the winding structure may have one positive electrode 11 and one negative electrode 12.

Hereinafter, elements constituting the battery element 10 and the electrolytic solution will be described in detail. In the following description, although not particularly limited, elements in the lithium ion secondary battery will be described.

[1] Negative Electrode

The negative electrode has a structure in which, for example, a negative electrode active material is adhered to a negative electrode current collector by a thickener for a negative electrode, and the negative electrode active material is laminated on the negative electrode current collector as a negative electrode active material layer. Any material capable of absorbing and desorbing lithium ions with charge and discharge can be used as the negative electrode active material in the present example embodiment as long as the effect of the present invention is not significantly impaired. Normally, as in the case of the positive electrode, the negative electrode is also configured by providing the negative electrode active material layer on the current collector. Similarly to the positive electrode, the negative electrode may also have other layers as appropriate.

The negative electrode active material is not particularly limited as long as it is a material capable of absorbing and desorbing lithium ions, and a known negative electrode active material can be arbitrarily used. For example, it is preferable to use carbonaceous materials such as coke, acetylene black, mesophase microbead, graphite and the like; lithium metal; lithium alloy such as lithium-silicon, lithium-tin; lithium titanate and the like as the negative electrode active material. Among these, carbonaceous materials are most preferably used from the viewpoint of good cycle characteristics and safety and further excellent continuous charge characteristics. One negative electrode active material may be used alone, or two or more negative electrode active materials may be used in combination in any combination and ratio.

Furthermore, the particle diameter of the negative electrode active material is arbitrary as long as the effect of the present invention is not significantly impaired. However, in terms of excellent battery characteristics such as initial efficiency, rate characteristics, cycle characteristics, etc., the particle diameter is usually 1 µm or more, preferably 15 µm or more, and usually about 50 µm or less, preferably about 30 µm or less. Furthermore, for example, it can be also used as the carbonaceous material such as a material obtained by coating the carbonaceous material with an organic substance such as pitch or the like and then calcining the carbonaceous material, or a material obtained by forming amorphous carbon on the surface using the CVD method or the like. Examples of the organic substances used for coating include coal tar pitch from soft pitch to hard pitch; coal heavy oil such as dry distilled liquefied oil; straight run heavy oil such as atmospheric residual oil and vacuum residual oil, crude oil; petroleum heavy oil such as decomposed heavy oil (for example, ethylene heavy end) produced as a by-product upon thermal decomposition of crude oil, naphtha and the like. A residue obtained by distilling these heavy oil at 200 to 400° C. and then pulverized to a size of 1 to 100 µm can also be used as the organic substance. In addition, vinyl chloride resin, phenol resin, imide resin and the like can also be used as the organic substance.

In one example embodiment of the present invention, the negative electrode includes a metal and/or a metal oxide and carbon as the negative electrode active material. Examples of the metal include Li, Al, Si, Pb, Sn, In, Bi, Ag, Ba, Ca, Hg, Pd, Pt, Te, Zn, La, and alloys of two or more of these. These metals or alloys may be used as a mixture of two or more. In addition, these metals or alloys may contain one or more non-metal elements.

Examples of the metal oxide include silicon oxide, aluminum oxide, tin oxide, indium oxide, zinc oxide, lithium oxide, and composites of these. In the present example embodiment, tin oxide or silicon oxide is preferably contained as the negative electrode active material, and silicon oxide is more preferably contained. This is because silicon oxide is relatively stable and hardly causes reaction with other compounds. Also, for example, 0.1 to 5 mass % of one or more elements selected from nitrogen, boron and sulfur can be added to the metal oxide. In this way, the electrical conductivity of the metal oxide can be improved. Also, the electrical conductivity can be similarly improved by coating the metal or the metal oxide with an electroconductive material such as carbon by vapor deposition or the like.

Examples of the carbon include graphite, amorphous carbon, diamond-like carbon, carbon nanotube, and composites of these. Highly crystalline graphite has high electrical conductivity and is excellent in adhesiveness with respect to a negative electrode current collector made of a metal such as copper and voltage flatness. On the other hand, since amorphous carbon having a low crystallinity has a relatively small volume expansion, it has a high effect of alleviating the volume expansion of the entire negative electrode, and deterioration due to nonuniformity such as crystal grain boundaries and defects hardly occurs.

The metal and the metal oxide have the feature that the capacity of accepting lithium is much larger than that of carbon. Therefore, the energy density of the battery can be improved by using a large amount of the metal and the metal oxide as the negative electrode active material. In order to achieve high energy density, it is preferable that the content ratio of the metal and/or the metal oxide in the negative electrode active material is high. A larger amount of the metal and/or the metal oxide is preferable, since it increases the capacity of the negative electrode as a whole. The metal and/or the metal oxide is preferably contained in the negative electrode in an amount of 0.01% by mass or more of the negative electrode active material, more preferably 0.1% by mass or more, and further preferably 1% by mass or more. However, the metal and/or the metal oxide has large volume change upon absorbing and desorbing of lithium as compared with carbon, and electrical junction may be lost. Therefore, the amount of the metal and/or the metal oxide in the negative active material is 99% by mass or less, preferably 90% or less, more preferably 80 mass % or less. As described above, the negative electrode active material is a material capable of reversibly absorbing and desorbing lithium ions with charge and discharge in the negative electrode, and does not include other thickener and the like.

For example, the negative electrode active material layer may be formed into a sheet electrode by roll-forming the above-described negative electrode active material, or may be formed into a pellet electrode by compression molding. However, usually, as in the case of the positive electrode active material layer, the negative electrode active material layer can be formed by applying and drying an application liquid on a current collector, where the application liquid may be obtained by slurrying the above-described negative electrode active material, a binder or thickener, and various auxiliaries contained as necessary with a solvent.

The binder or thickener for the negative electrode is not particularly limited, and examples thereof include vinylidene fluoride-based polymer such as polyvinylidene fluoride, vinylidene fluoride-hexafluoropropylene copolymer, vinylidene fluoride-tetrafluoroethylene copolymer; soluble binder such as carboxymethyl cellulose (CMC), polypropylene, polyethylene, acrylic, acrylic acid, sodium acrylate, polyimide, polyamide imide; and dispersible binder such as polytetrafluoroethylene, styrene butadiene rubber (SBR). When an aqueous binder dispersion solution such as an SBR emulsion is used, a thickener such as carboxymethyl cellulose (CMC) can also be used. The amount of the negative electrode binder to be used is preferably 0.5 to 20 parts by mass relative to 100 parts by mass of the negative electrode active material from the viewpoint of a trade-off between "sufficient binding strength" and "high energy". The negative electrode binders may be mixed and used.

As the material of the negative electrode current collector, a known material can be arbitrarily used, and for example, a metal material such as copper, nickel, stainless steel, aluminum, chromium, silver and an alloy thereof is preferably used from the viewpoint of electrochemical stability. Among them, copper is particularly preferable from the viewpoint of ease of processing and cost. It is also preferable that the negative electrode current collector is also subjected to surface roughening treatment in advance. Further, the shape of the current collector is also arbitrary, and examples thereof include a foil shape, a flat plate shape and a mesh shape. A perforated type current collector such as an expanded metal or a punching metal can also be used.

The negative electrode can be produced, for example, by forming a negative electrode active material layer containing a negative electrode active material and a binder or thickener for a negative electrode on a negative electrode current collector. Examples of a method for forming the negative electrode active material layer include a doctor blade method, a die coater method, a CVD method, a sputtering method, and the like. After forming the negative electrode active material layer in advance, a thin film of aluminum, nickel or an alloy thereof may be formed by a method such as vapor deposition, sputtering or the like to obtain a negative electrode current collector.

An electroconductive auxiliary material may be added to a coating layer containing the negative electrode active material for the purpose of lowering the impedance. Examples of the electroconductive auxiliary material include flaky, sooty, fibrous carbonaceous microparticles and the like such as graphite, carbon black, acetylene black, vapor grown carbon fiber (for example, VGCF (registered trademark) manufactured by Showa Denko K.K.), and the like.

[2] Positive Electrode

The positive electrode refers to an electrode on the high potential side in a battery. As an example, the positive electrode includes a positive electrode active material capable of reversibly absorbing and desorbing lithium ions with charge and discharge, and has a structure in which a positive electrode active material is laminated on a current collector as a positive electrode active material layer integrated with a positive electrode binder. In one example embodiment of the present invention, the positive electrode has a charge capacity per unit area of 3 mAh/cm² or more, preferably 3.5 mAh/cm² or more. From the viewpoint of safety and the like, the charge capacity per unit area of the positive electrode is preferably 15 mAh/cm² or less. Here, the charge capacity per unit area is calculated from the theoretical capacity of the active material. That is, the charge capacity of the positive electrode per unit area is calculated by (theoretical capacity of the positive electrode active material used for the positive electrode)/(area of the positive electrode). Note that the area of the positive electrode refers to the area of one surface, not both surfaces of the positive electrode.

The positive electrode active material in the present example embodiment is not particularly limited as long as it is a material capable of absorbing and desorbing lithium, and can be selected from several viewpoints. A high-capacity compound is preferably contained from the viewpoint of high energy density. Examples of the high-capacity compound include nickel lithate ($LiNiO_2$) and a lithium nickel composite oxide obtained by partially replacing Ni of nickel lithate with another metal element, and a layered lithium nickel composite oxide represented by formula (A) below is preferable.

$$Li_yNi_{(1-x)}M_xO_2 \qquad (A)$$

(provided that $0 \leq x < 1$, $0 < y \leq 1.2$, and M is at least one element selected from the group consisting of Co, Al, Mn, Fe, Ti, and B.)

From the viewpoint of high capacity, the Ni content is preferably high, or that is to say, x is less than 0.5 in formula (A), and more preferably 0.4 or less. Examples of such compounds include $Li_\alpha Ni_\beta Co_\gamma Mn_\delta O_2$ ($0 < \alpha \leq 1.2$, preferably $1 \leq \alpha \leq 1.2$, $\beta+\gamma+\delta=1$, $\beta \geq 0.7$, and $\gamma \leq 0.2$) and $Li_\alpha Ni_\beta Co_\gamma Al_\delta O_2$ ($0 < \alpha \leq 1.2$ preferably $1 \leq \alpha \leq 1.2$, $\beta+\gamma+\delta=1$, $\beta \geq 0.6$ preferably $\beta \geq 0.7$, $\gamma \leq 0.2$), and, in particular, $LiNi_\beta Co_\gamma Mn_\delta O_2$ ($0.75 \leq \beta \leq 0.85$, $0.05 \leq \gamma \leq 0.15$, $0.10 \leq \delta \leq 0.20$). More specifically, for example, $LiNi_{0.8}Co_{0.05}Mn_{0.15}O_2$, $LiNi_{0.8}Co_{0.1}Mn_{0.1}O_2$, $LiNi_{0.8}Co_{0.15}Al_{0.05}O_2$, and $LiNi_{0.8}Co_{0.1}Al_{0.1}O_2$ can be preferably used.

From the viewpoint of heat stability, it is also preferable that the Ni content does not exceed 0.5, or that is to say, x is 0.5 or more in formula (A). It is also preferable that a certain transition metal does not account for more than half. Examples of such compounds include $Li_\alpha Ni_\beta Co_\gamma Mn_\delta O_2$ ($0<\alpha \leq 1.2$ preferably $1 \leq \alpha \leq 1.2$, $\beta+\gamma+\delta=1$, $0.2 \leq \beta \leq 0.5$, $0.1 \leq \gamma \leq 0.4$, $0.1 \leq \delta \leq 0.4$). More specific examples include $LiNi_{0.4}Co_{0.3}Mn_{0.3}O_2$ (abbreviated as NCM433), $LiNi_{1/3}Co_{1/3}Mn_{1/3}O_2$, $LiNi_{0.5}Co_{0.2}Mn_{0.3}O_2$ (abbreviated as NCM523), and $LiNi_{0.5}Co_{0.3}Mn_{0.2}O_2$ (abbreviated as NCM532) (provided that these compounds include those in which the content of each transition metal is varied by about 10%).

Also, two or more compounds represented by formula (A) may be used as a mixture, and, for example, it is also preferable to use NCM532 or NCM523 with NCM433 in a range of 9:1 to 1:9 (2:1 as a typical example) as a mixture. Moreover, a battery having a high capacity and a high heat stability can be formed by mixing a material having a high Ni content (x is 0.4 or less) with a material having a Ni content not exceeding 0.5 (x is 0.5 or more, such as NCM433) in formula (A).

Other than the above positive electrode active materials, examples include lithium manganates having a layered structure or a spinel structure, such as $LiMnO_2$, $Li_xMn_2O_4$ ($0<x<2$), $Li_2MnO_3$, and $Li_xMn_{1.5}Ni_{0.5}O_4$ ($0<x<2$); $LiCoO_2$ and those obtained by partially replacing these transition metals with other metals; those having an excess of Li based on the stoichiometric compositions of these lithium transition metal oxides; and those having an olivine structure such as $LiFePO_4$. Moreover, materials obtained by partially replacing these metal oxides with Al, Fe, P, Ti, Si, Pb, Sn, In, Bi, Ag, Ba, Ca, Hg, Pd, Pt, Te, Zn, La, or the like can be used as well. One of the positive electrode active materials described above may be used singly, or two or more can be used in combination.

For example, the positive electrode active material layer may be formed into a sheet electrode by roll-forming the above-described positive electrode active material, or may be formed into a pellet electrode by compression molding, similar to the negative electrode active material layer. However, usually, as in the case of the positive electrode active material layer, the negative electrode active material layer can be formed by applying and drying an application liquid on a current collector, where the application liquid may be obtained by slurrying the above-described negative electrode active material, a binder or thickener, and various auxiliaries contained as necessary with a solvent.

A binder or thickener for a positive electrode binder similar to the binder or thickener for the negative electrode can be used. Among them, polyvinylidene fluoride or polytetrafluoroethylene is preferable from the viewpoint of versatility and low cost, and polyvinylidene fluoride is more preferable. The amount of the positive electrode binder used is preferably 2 to 10 parts by mass relative to 100 parts by mass of the positive electrode active material from the viewpoint of a trade-off between "sufficient binding strength" and "high energy".

An electroconductive auxiliary material may be added to a coating layer containing the positive electrode active material for the purpose of lowering the impedance. Examples of the conductive auxiliary material include flaky, sooty, fibrous carbonaceous microparticles and the like such as graphite, carbon black, acetylene black, vapor grown carbon fiber (for example, VGCF manufactured by Showa Denko K.K.) and the like.

A positive electrode current collector similar to the negative electrode current collector can be used. In particular, as the positive electrode, a current collector using aluminum, an aluminum alloy, iron, nickel, chromium, molybdenum type stainless steel is preferable.

An electroconductive auxiliary material may be added to a positive electrode active material layer containing the positive electrode active material for the purpose of lowering the impedance. Examples of the conductive auxiliary material include carbonaceous microparticles such as graphite, carbon black and acetylene black.

[3] Insulating Layer
(Material and Manufacturing Method Etc.)

The insulating layer can be formed by applying a slurry composition for an insulating layer so as to cover a part of the active material layer of the positive electrode or the negative electrode and drying and removing a solvent. Although the insulating layer may be formed on only one side of the active material layer, there is an advantage that the warpage of the electrode can be reduced by forming the insulating layer on both side (in particular, as a symmetrical structure).

A slurry for the insulating layer is a slurry composition for forming a porous insulating layer. Therefore, the "insulating layer" can also be referred to as "porous insulating layer". The slurry for the insulating layer comprises non-conductive particles and a binder or thickener having a specific composition, and the non-conductive particles, the binder or thickener and optional components are uniformly dispersed as a solid content in a solvent.

It is desirable that the non-conductive particles stably exist in the use environment of the lithium ion secondary battery and are electrochemically stable. As the non-conductive particles, for example, various inorganic particles, organic particles and other particles can be used. Among them, inorganic oxide particles or organic particles are preferable, and in particular, from the viewpoint of high thermal stability of the particles, it is more preferable to use inorganic oxide particles. Metal ions in the particles sometimes form salts near the electrode, which may cause an increase in the internal resistance of the electrode and a decrease in cycle characteristics of the secondary battery. The other particles include particles to which conductivity is given by surface treatment of the surface of fine powder with a non-electrically conductive substance. The fine powder can be made from a conductive metal, compound and oxide such as carbon black, graphite, $SnO_2$, ITO and metal powder. Two or more of the above-mentioned particles may be used in combination as the non-conductive particles.

Examples of the inorganic particles include inorganic oxide particles such as aluminum oxide, silicon oxide, magnesium oxide, titanium oxide, $BaTiO_2$, ZrO, alumina-silica composite oxide; inorganic nitride particles such as aluminum nitride and boron nitride; covalent crystal particles such as silicon, diamond and the like; sparingly soluble ionic crystal particles such as barium sulfate, calcium fluoride, barium fluoride and the like; clay fine particles such as talc and montmorillonite. These particles may be subjected to element substitution, surface treatment, solid solution treatment, etc., if necessary, and may be used singly or in combination of two or more kinds. Among them, inorganic oxide particles are preferable from the viewpoints of stability in the electrolytic solution and potential stability.

The shape of the inorganic particles is not particularly limited, and may be spherical, needle-like, rod-like, spindle-shaped, plate-like, or the like.

Examples of the plate-like non-conductive particles, particularly inorganic particles preferably used include various commercially available products such as "SUNLOVELY" ($SiO_2$) manufactured by AGC Si-Tech Co., Ltd., pulverized product of "NST-B 1" ($TiO_2$) manufactured by Ishihara Sangyo Kaisha, Ltd., plate like barium sulfate "H series", "HL series" manufactured by Sakai Chemical Industry Co., Ltd., "Micron White" (Talc) manufactured by Hayashi Kasei Co., Ltd., "Benger" (bentonite) manufactured by Hayashi Kasei Co., Ltd., "BMM" and "BMT" (boehmite) manufactured by Kawaii Lime Industry Co., Ltd., "Serasur BMT-B" [alumina ($Al_2O_3$)] manufactured by Kawaii Lime Industry Co., Ltd., "Serath" (alumina) manufactured by Kinsei Matec Co., Ltd., "AKP series" (alumina) manufactured by Sumitomo Chemical Co., Ltd., and "Hikawa Mica Z-20" (sericite) manufactured by Hikawa Mining Co., Ltd. In addition, $SiO_2$, $Al_2O_3$, and $ZrO$ can be produced by the method disclosed in Japanese Patent Laid-Open No. 2003-206475.

When the non-conductive particles are spherical shape, the average particle diameter of the non-conductive particles is preferably in the range of 0.005 to 10 µm, more preferably 0.1 to 5 µm, particularly preferably 0.3 to 2 µm. When the average particle size of the non-conductive particles is in the above range, the dispersion state of the porous film slurry is easily controlled, so that it is easy to manufacture a porous insulating layer having a uniform and uniform thickness. In addition, such average particle size provides the following advantages. The adhesion to the binder or thickener is improved, and even when the porous insulating layer is wound, it is possible to prevent the non-conductive particles from peeling off, and as a result, sufficient safety can be achieved even if the porous insulating layer is thinned. Since it is possible to suppress an increase in the particle packing ratio in the porous insulating layer, it is possible to suppress a decrease in ion conductivity in the porous insulating layer. Furthermore, the porous insulating layer can be made thin.

The average particle size of the non-conductive particles can be obtained by arbitrarily selecting 50 primary particles from an SEM (scanning electron microscope) image in an arbitrary field of view, carrying out image analysis, and obtaining the average value of circle equivalent diameters of each particle.

The particle diameter distribution (CV value) of the non-conductive particles is preferably 0.5 to 40%, more preferably 0.5 to 30%, particularly preferably 0.5 to 20%. By setting the particle size distribution of the non-conductive particles within the above range, a predetermined gap between the non-conductive particles is maintained, so that it is possible to suppress an increase in resistance due to the inhibition of movement of lithium. The particle size distribution (CV value) of the non-conductive particles can be determined by observing the non-conductive particles with an electron microscope, measuring the particle diameter of 200 or more particles, determining the average particle diameter and the standard deviation of the particle diameter, and calculating (Standard deviation of particle diameter)/(average particle diameter). The larger the CV value means the larger variation in particle diameter.

When the solvent contained in the slurry for insulating layer is a non-aqueous solvent, a polymer dispersed or dissolved in a non-aqueous solvent can be used as a binder. As the polymer dispersed or dissolved in the non-aqueous solvent, polyvinylidene fluoride (PVdF), polytetrafluoroethylene (PTFE), polyhexafluoropropylene (PHFP), polytrifluoroethylene chloride (PCTFE), polyperfluoroalkoxyfluoroethylene, polyimide, polyamideimide, and the like can be used as a binder, and it is not limited thereto. Among the above binders, a binder soluble in a solvent is included in the category of a thickener because the binder increases the viscosity of the solution.

In addition, a binder used for binding the active material layer can also be used.

When the solvent contained in the slurry for insulating layer is an aqueous solvent (a solution using water or a mixed solvent containing water as a main component as a dispersion medium of the binder), a polymer dispersed or dissolved in an aqueous solvent can be used as a binder or thickener. A polymer dispersed or dissolved in an aqueous solvent includes, for example, an acrylic resin. As the acrylic resin, it is preferably to use homopolymers obtained by polymerizing monomers such as acrylic acid, methacrylic acid, acrylamide, methacrylamide, 2-hydroxyethyl acrylate, 2-hydroxyethyl methacrylate, methyl methacrylate, ethylhexyl acrylate, butyl acrylate. The acrylic resin may be a copolymer obtained by polymerizing two or more of the above monomers. Further, two or more of the homopolymer and the copolymer may be mixed. In addition to the above-mentioned acrylic resin, polyolefin resins such as styrene butadiene rubber (SBR) and polyethylene (PE), polytetrafluoroethylene (PTFE), and the like can be used. These polymers can be used singly or in combination of two or more kinds. Among them, it is preferable to use an acrylic resin or carboxymethyl cellulose (CMC). The form of the binder is not particularly limited, and particles in the form of particles (powder) may be used as they are, or those prepared in a solution state or an emulsion state may be used. Two or more kinds of binders may be used in different forms. Among the above binders, a binder soluble in a solvent is included in the category of a thickener because the binder increases the viscosity of the solution.

The insulating layer may contain a material other than the above-described non-conductive filler and binder, if necessary. Examples of such material include various polymer materials that can function as a viscosity modifier for a slurry for the insulating layer, which will be described later. In particular, when an aqueous solvent is used, it is preferable to contain a polymer functioning as the viscosity modifier. As the polymer functioning as the viscosity modifier, carboxymethyl cellulose (CMC) or methyl cellulose (MC) is preferably used.

Although not particularly limited, the ratio of the non-conductive filler to the entire insulating layer is suitably about 70 mass % or more (for example, 70 mass % to 99 mass %), preferably 80 mass % or more (for example, 80 mass % to 99 mass %), and particularly preferably about 90 mass % to 95 mass %.

The ratio of the binder in the insulating layer is suitably about 1 to 30 mass % or less, preferably 5 to 20 mass % or less. In the case of containing an insulating layer-forming component other than the non-conductive filler and the binder, for example, a viscosity modifier, the content ratio of the viscosity modifier is preferably about 10 mass % or less, more preferably about 7 mass % or less. If the ratio of the binder is too small, strength (shape retentivity) of the insulating layer itself and adhesion to the active material layer are lowered, which may cause defects such as cracking and peeling. If the ratio of the binder is too large, gaps between the particles of the insulating layer become insufficient, and the ion permeability in the insulating layer may decrease in some cases.

In order to maintain ion conductivity, the porosity (void ratio) (the ratio of the pore volume to the apparent volume) of the insulating layer is preferably 20% or more, more preferably 30% or more. However, if the porosity is too high, falling off or cracking of the insulating layer due to friction or impact applied to the insulating layer occurs, the porosity is preferably 80% or less, more preferably 70% or less.

The porosity can be calculated from the ratio of the materials constituting the insulating layer, the true specific gravity and the coating thickness.

(Forming of Insulating Layer)

A method of forming the insulating layer will be described. As a material for forming the insulating layer, a paste type material (including slurry form or ink form, the same applies below) mixed and dispersed with an inorganic filler, a binder and a solvent can be used.

A solvent used for the insulating layer slurry includes water or a mixed solvent mainly containing water. As a solvent other than water constituting such a mixed solvent, one or more kinds of organic solvents (lower alcohols, lower ketones, etc.) which can be uniformly mixed with water can be appropriately selected and used. Alternatively, it may be an organic solvent such as N-methylpyrrolidone (NMP), pyrrolidone, methyl ethyl ketone, methyl isobutyl ketone, cyclohexanone, toluene, dimethylformamide, dimethylacetamide, or a combination of two or more thereof. The content of the solvent in the slurry for the insulating layer is not particularly limited, and it is preferably 40 to 90 mass %, particularly preferably about 50 to 70 mass %, of the entire coating material.

The operation of mixing the non-conductive filler and the binder or thickener with the solvent can be carried out by using a suitable kneading machine such as a ball mill, a homodisper, Disper Mill (registered trademark), Clearmix (registered trademark), Filmix (registered trademark), an ultrasonic dispersing machine.

For the operation of applying the slurry for the insulating layer, conventional general coating means can be used without restricting. For example, a predetermined amount of the slurry for the insulating layer can be applied by coating in a uniform thickness by means of a suitable coating device (a gravure coater, a slit coater, a die coater, a comma coater, a dip coater, etc.). In the case of applying a slurry having a high viscosity as in this example embodiment, it is preferable to use a slit coater and a die coater which extrude and apply slurry by a pump, among the above-mentioned coating apparatus.

Thereafter, the solvent in the slurry for the insulating layer may be removed by drying the coating material by means of a suitable drying means.

(Thickness)

The thickness of the insulating layer is preferably 1 μm or more and 30 μm or less, and more preferably 2 μm or more and 15 μm or less.

[4] Electrolyte

As the electrolytic solution, a non-aqueous electrolytic solution that is stable at the operating potential of the battery is preferable, but it is not particularly limited. Specific examples of the non-aqueous electrolytic solution include an aprotic organic solvent including cyclic carbonates such as propylene carbonate (PC), ethylene carbonate (EC), fluoroethylene carbonate (FEC), t-difluoroethylene carbonate (t-DFEC), butylene carbonate (BC), vinylene carbonate (VC), vinyl ethylene carbonate (VEC); chain carbonates such as allyl methyl carbonate (AMC), dimethyl carbonate (DMC), diethyl carbonate (DEC), ethyl methyl carbonate (EMC), dipropyl carbonate (DPC); propylene carbonate derivatives; aliphatic carboxylic acid esters such as methyl formate, methyl acetate, ethyl propionate and the like; cyclic esters such as γ-butyrolactone (GBL). The non-aqueous electrolytic solution may be used singly or in combination of two or more. Sulfur-containing cyclic compounds such as sulfolane, fluorinated sulfolane, propane sultone, propene sultone and the like can be used as the non-aqueous electrolytic solution.

Specific examples of supporting salts contained in the electrolytic solution include lithium salts such as $LiPF_6$, $LiAsF_6$, $LiAlCl_4$, $LiClO_4$, $LiBF_4$, $LiSbF_6$, $LiCF_3SO_3$, $LiC_4F_9SO_3$, $Li(CF_3SO_2)_2$, $LiN(CF_3SO_2)_2$ and the like, but are not limited. As the supporting salt, one type may be used alone, or two kinds or more may be used in combination.

[5] Separator

When the battery element 10 has the separator 13 between the positive electrode 11 and the negative electrode 12, the separator is not particularly limited, and a porous film or a nonwoven fabric made of polypropylene, polyethylene, fluororesin, polyamide, polyimide, polyester, polyphenylene sulfide or the like can be used as the separator. In addition, those including inorganic materials such as silica, alumina, glass and the like adhered or joined to the porous firm or the nonwoven fabric used as a base material and the inorganic materials alone processed into a nonwoven fabric or a cloth can also be used as the separator. The thickness of the separator 13 may be arbitrary. However, from the viewpoint of high energy density, it is preferable that the thickness of the separator 13 is thin, for example, it can be 10 to 30 μm.

The present invention is not limited to the above described lithium ion secondary battery and can be applied to any battery. However, since the problem of heat often occurs in batteries with high capacity in many cases, the present invention is preferably applied to batteries with high capacity, particularly lithium ion secondary batteries.

Next, example embodiments of method for manufacturing the electrode shown in FIG. 3 will be described. In the following description, the positive electrode 11 and the negative electrode 12 will be described as "electrodes" without particularly distinguishing from each other, but the positive electrode 11 and the negative electrode differ only in the materials, shapes, etc. to be used, and the following explanation will be made on the positive electrode 11 and the negative electrode 12.

The electrode has a structure in which the active material layer 111 and the insulating layer 112 are laminated in this order on the current collector 110 finally. Such a laminated structure is obtained by a method comprising applying a slurry for an active material layer to the current collector 110, applying a slurry for a insulating layer to the slurry for the active material layer before the slurry for the active material layer is dried, and drying the slurries for the active material layer and the insulating layer after applying the slurries for the active material layer and the insulating layer to obtain a laminated structure in which the active material layer and the insulating layer are laminated in this order on the current collector.

Herein, in the present example embodiment, it is important that a first binder or thickener which is a binder or thickener for a slurry for the active material layer (slurry for the first layer) and a second binder or thickener which is a binder or thickener for a slurry for the insulating layer (slurry for the second layer) are selected such that when viscosities are measured for a first solution including solvent and the first binder or thickener dissolved in the solvent in a specific mass ration and a second solution including a solvent and the second binder or thickener dissolved in the solvent at the same mass ration as the mass ration of the first binder or thickener under the same conditions, the viscosity of the first solution is higher than the viscosity of the second solution.

In order to suppress mixing of the slurry for the active material layer and the slurry for the insulating layer, it is important to appropriately modify the viscosity of both the slurries. With respect to the slurry for the active material layer, in order to increase the amount of the active material relatively by reducing the amount of the binder or thickener from the viewpoint of an increase in the energy density, it is important to select materials for the binder or thickener so as to achieve a predetermined adhesion or a predetermined slurry viscosity even with a small amount of the binder or thickener. With respect to the slurry for the insulating layer, it is preferred to reduce the evaporation time of the solvent from the viewpoint of suppressing the mixing described above, and thus the solid content ratio of the slurry for the insulating layer is preferably high. However, merely increasing the solid content ratio makes the viscosity of the slurry for the insulating layer excessively high, causing difficulty in application.

Then, when a thickener polymer giving a higher viscosity of a solution prepared by dissolving the thickener at a specific mass percentage in a solvent and another thickener polymer giving a lower viscosity of a solution prepared by dissolving the other thickener in the same specific mass percentage in the same solvent are each used to prepare solutions having the same viscosity, the latter can reduce the solvent in comparison with the former. For this reason, selecting the latter as the thickener polymer for the slurry for the insulating layer can increase the solid content ratio while the slurry viscosity is maintained at a predetermined value and can evaporate the solvent in a shorter time. Thereby, consequently, mixing of the slurry for the active material layer and the slurry for the insulating layer is suppressed, and a high insulation property of the insulating layer is achieved. Accordingly, occurrence of an insulation failure is suppressed in a secondary battery in which the electrode obtained is used.

Making the molecular weight of the second thickener lower than the molecular weight of the first thickener enables each of the viscosity and the solid content ratio of the slurry for the insulating layer to be adjusted to an appropriate value. Consequently, while mixing of the slurry for the active material layer and the slurry for the insulating layer is suppressed, the active material layer and the insulating layer each can serve their own role. For example, the active material layer can reduce the binder due to its high molecular weight to thereby achieve a high energy density as well as the insulating layer achieves a high insulation property. Accordingly, a reduction in the charge and discharge capacity and occurrence of an insulation failure are suppressed in a secondary battery in which the electrode obtained is used. Molecular weights to be compared include a weight average molecular weight and a number average molecular weight, either of which may be used for comparison in the present example embodiment. Of these, the weight average molecular weight is preferably used for comparison.

Generally, the viscosity and fluidity of a slurry are dependent not only on the concentration of the binder or thickener contained in the slurry, but also on the properties of the binder or thickener itself resulting from the molecular structure and molecular weight thereof. For example, that the viscosity of the first solution is higher than the viscosity of the second solution and that the molecular weight of the second binder or thickener is smaller than the molecular weight of the first binder or thickener, as mentioned above, can mean that the second binder or thickener more easily moves than the first binder or thickener. That the second binder or thickener easily moves means that it is possible to obtain a slurry for the second layer having a desired viscosity using a smaller amount of a solvent. Use of a smaller amount of a solvent leads to a reduction in the drying time of the slurry for the second layer, resulting in suppression of mixing of the first layer and second layer, for example, mixing of the active material layer and the insulating layer.

In order to more efficiently suppress mixing of the active material layer and the insulating layer, when the viscosity of each of the slurry for the active material layer and the slurry for the insulating layer is measured at 25° C. and a shear rate of 1/sec, it is preferred that the viscosity of the slurry for the active material layer be 12000 mPa·s or more and/or the viscosity of the slurry for the insulating layer be 4000 mPa·s or more. Alternatively, it is preferred that the viscosity of the slurry for the active material layer be 5000 mPa·s or more and the viscosity of the slurry for the insulating layer be 4000 mPa·s or more. It is more preferred that the viscosity of the active material slurry and the viscosity of the slurry for the insulating layer be 50000 mPa·s or more.

When the viscosity of each of the slurry for the active material layer and the slurry for the insulating layer is excessively high, it becomes difficult to form an active material layer and an insulating layer having a uniform thickness. Alternatively, when the viscosity of a slurry is excessively high, it becomes difficult to handle the slurry, and also to apply the slurry with a coater. Thus, in order to allow the active material layer and the insulating layer to have a uniform thickness and to achieve coatability with a coater, the viscosity of each of the slurry for the active material layer and the slurry for the insulating layer under the measurement conditions described above is preferably 200000 mPa·s or less.

The viscosity as specified above is a viscosity in contemplation of the state after the slurry for the active material layer and the slurry for the insulating layer are applied. When the viscosity in application is excessively high, the coatability of the active material layer and/or the insulating layer may decrease. Thus, the slurry for the active material layer and/or the slurry for the insulating layer preferably has a viscosity measured at 25° C. and a shear rate of 5/sec that is less than half of the viscosity measured at 25° C. and a shear rate of 1/sec as above. This enables the fluidity of the slurry for the active material layer and/or the slurry for the insulating layer in application to be achieved, enabling highly efficient application.

In order to suppress mixing of the active material layer and the insulating layer more efficiently, after the active material slurry is applied and before the slurry for the insulating layer is applied, at least the surface of the slurry for the active material layer is preferably cooled. Cooling of the slurry for the active material layer referred to herein means that at least the surface of the active material slurry applied is made to have a temperature equal to or less than the temperature of the active material slurry applied (usually, normal temperature of 5 to 35° C., for example). In a state where at least the surface of the slurry for the active material layer is cooled, the substantial viscosity of the surface of the slurry for the active material layer increases. Applying the slurry for the insulating layer on the slurry for the active material layer in such a state enables mixing of the active material layer and the insulating layer to be suppressed more effectively. The slurry for the active material layer applied can be cooled by allowing cooling wind having a temperature less than that of the slurry for the active material layer to blow on the surface of the slurry for the active material layer applied, using a fan, for example.

From the viewpoint of making the slurry for the active material layer and the slurry for the insulating layer to be unlikely to mix on the interface therebetween, it is preferred to increase the solid content ratio of the slurry for the insulating layer (e.g., 50% or more). An increase in the solid content ratio of the slurry for the insulating layer facilitates drying of the slurry for the insulating layer before the slurry for the active material layer and the slurry for the insulating layer sufficiently mix on the interface therebetween, and consequently, it is possible to suppress mixing of the slurry for the active material layer and the slurry for the insulating layer on the interface therebetween.

In a step of obtaining a laminated structure, it is preferred that the time from the completion of application of the slurry for the insulating layer to the start of drying the slurry for the active material layer and the slurry for the insulating layer be as short as possible (e.g., 10 seconds or less). Also in this case, as described above, drying of the slurry for the insulating layer is facilitated before the slurry for the active material layer and the slurry for the insulating layer sufficiently mix on the interface therebetween, and consequently, it is possible to suppress mixing of the slurry for the active material layer and the slurry for the insulating layer on the interface therebetween.

From the viewpoint of the adhesive force between the active material layer and the insulating layer, the slurry for the active material layer and the slurry for the insulating layer preferably contain the same main component in each of their binders or the same main component in each of their solvents. More preferably, both of the main components are the same. When at least one of, more preferably both the main component in each of their binders and the main component in each of their solvents of the slurry for the active material layer and the slurry for the insulating layer are the same, as described above, the active material layer and the insulating layer will have an increase in the adhesive force. "Containing the same main component in each of their binders" referred to herein means that the types of the polymers are the same, and the molecular weight, side chain, substituent, degree of etherification, and the like may be different.

Figure 6:
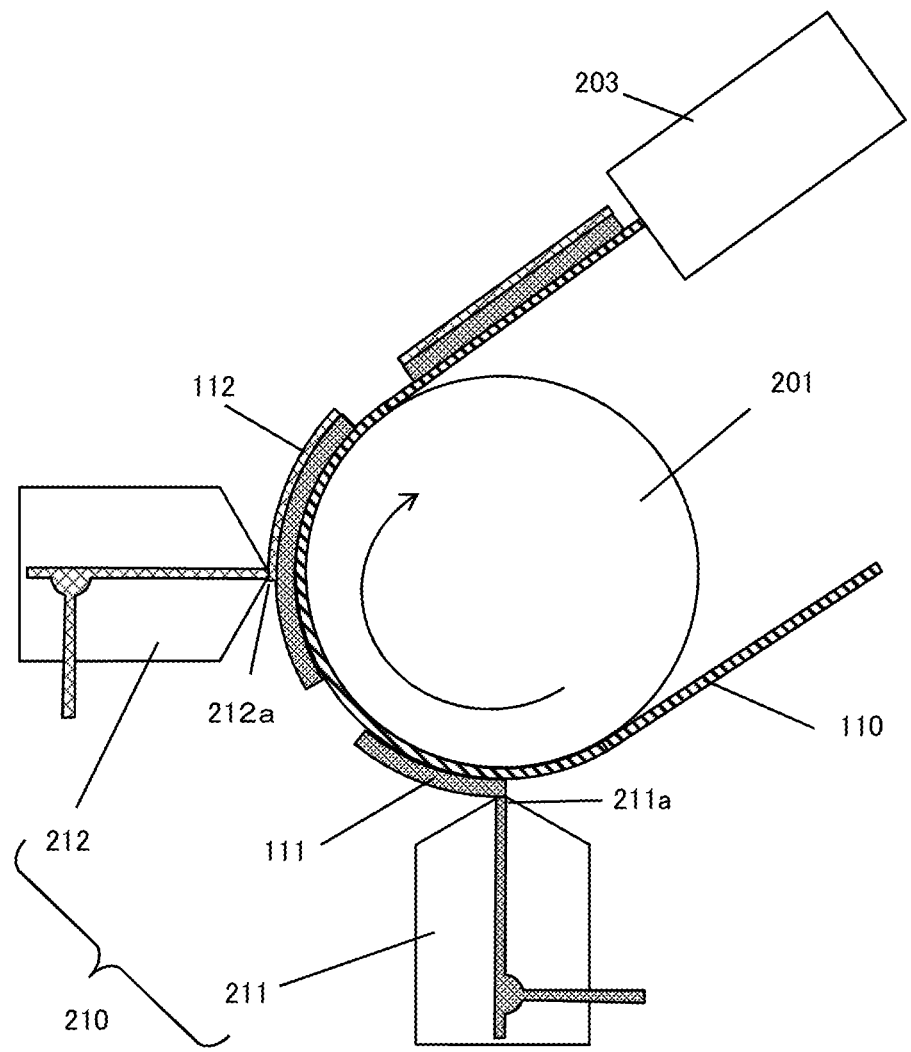
FIG. 6 is a schematic view of one embodiment of an electrode manufacturing apparatus for manufacturing the electrode having the configuration shown in FIG. 2.

For manufacturing the electrode, for example, the manufacturing apparatus shown in FIG. 6 can be used. The manufacturing apparatus shown in FIG. 6 includes a backup roller 201, a die coater 210 and a drying machine 203.

The backup roller 201 rotates in a state in which the long current collector 110 is wound on the outer peripheral surface of the backup roller 201 whereby the current collector 110 is fed in the rotation direction of the backup roller 201 while the rear surface of the current collector 110 is supported. The die coater 210 has a first die head 211 and a second die head 212 which are spaced from each other in the radial direction and the circumferential direction of the backup roller 201 with respect to the outer circumferential surface of the backup roller 201.

The first die head 211 is for applying the active material layer 111 on the surface of the current collector 110 and is located on the upstream side of the second die head 212 with respect to the feed direction of the current collector 110. A discharge opening 211a having a width corresponding to the applying width of the active material layer 111 is opened at the tip of the first die head 211 facing the backup roller 201. The slurry for the active material layer is discharged from the discharger opening 211a. The slurry for the active material layer is prepared by dispersing particles of an active material and a binder (thickener) in a solvent, and is supplied to the first die head 211.

The second die head 212 is for applying the insulating layer 112 on the surface of the active material layer 111 and is located on the downstream side of the first die head 211 with respect to the feed direction of the current collector 110. A discharge opening 212a having a width corresponding to the applying width of the insulating layer 112 is opened at the tip of the second die head 212 facing the backup roller 201. The slurry for the insulating layer is discharged from the discharge opening 212a. The slurry for the insulating layer is prepared by dispersing non-conductive particles and a binder (thickener) in a solvent, and is supplied to the second die head 212.

A solvent is used for preparing the slurry for the active material layer and the slurry for the insulating layer. When N-methyl-2-pyrrolidone (NMP) is used as the solvent, peeling strength of the layer obtained by evaporating the solvent can be increased compared with the case of using an aqueous solvent. When N-methyl-2-pyrrolidone was used as a solvent, the solvent did not evaporate completely even if the solvent was evaporated in a subsequent step, and the obtained layer contains a slight amount of N-methyl-2-pyrrolidone.

The drying machine 203 is for evaporating the solvent from the slurry for the active material layer and the slurry for the insulating layer respectively discharged from the first die head 211 and the second die head 212. The slurries are dried by the evaporation of the solvent, whereby the active material layer 111 and an insulating layer 112 are formed.

Next, a manufacturing process of the electrode by means of the manufacturing apparatus shown in FIG. 6 will be described. For convenience of explanation, the slurry for the active material layer and the active material layer obtained therefrom are described as "active material layer 111" without distinguishing between them. Actually, the "active material layer 111" before drying means the slurry for the active material layer. Similarly, the "insulating layer 112" before drying means the slurry for the insulating layer.

Figure 6A:
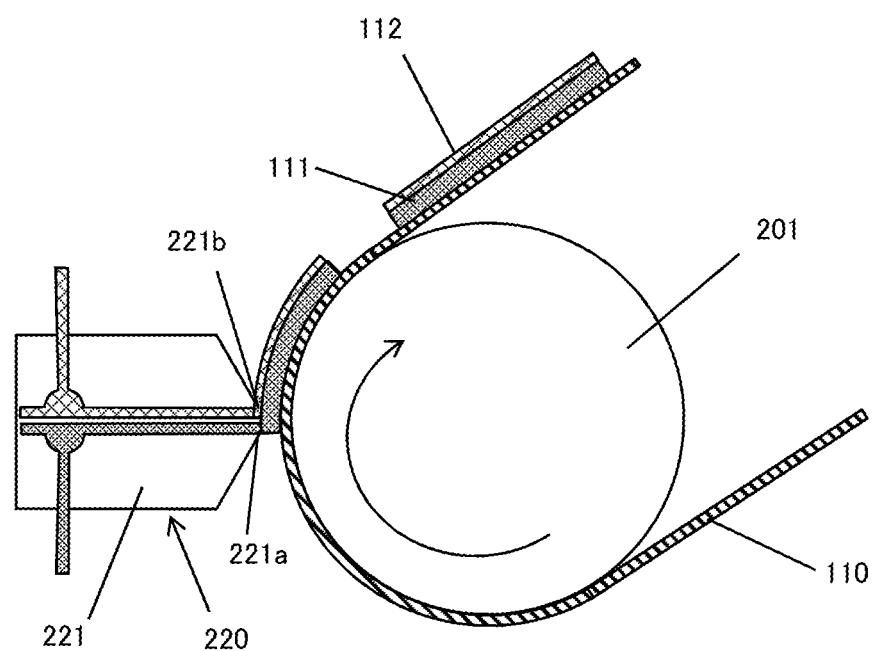
FIG. 6A is a schematic view of another embodiment of the electrode manufacturing apparatus.

First, the active material layer 111 slurried with a solvent is intermittently applied to the surface of the long current collector 110 supported and fed on the backup roller 201 by using the first die head 211. As a result, as shown in FIG. 6A, a slurry of the active material layer 111 is applied to the current collector 110 at intervals in the feeding direction A of the current collector 110. By intermittently applying the active material layer 111 with the first die head 211, the active material layer 111 is applied in a rectangular shape having a longitudinal length parallel to the feeding direction A of the current collector 110 and a lateral length along a direction orthogonal thereto.

Next, when the leading end of the applied active material layer 111 in the feeding direction of the current collector 111 is fed to a position facing the discharge opening 212a of the second die head 212, the insulating layer 112 slurried with solvent is intermittently applied to the active material layer 111 by using the second die head 212. The insulating layer 112 is applied so that a part thereof is exposed at the end portion of the active material layer 111 when viewing the current collector 110 in its thickness direction. The insulating layer 112 is applied before the active material layer 111 is dried, that is, before the solvent of the active material layer 111 is evaporated. By intermittently applying the insulating layer 112 with the second die head 212, the insulating layer 112 is applied in a rectangular shape having a longitudinal length parallel to the feeding direction A of the current collector 110 and a lateral length along a direction perpendicular thereto.

In the present example embodiment, the first die head 211 and the second die head 212 have the same width (the dimension in the direction orthogonal to the feeding direction A of the current collector 110) of the projecting openings 211a and 212a, and the active material layer 111 and the insulating layer 112 have the same applying width.

After applying the active material layer 111 and the insulating layer 112, the current collector 110 is fed to the drying machine 203, the solvents of the slurry for the active material layer and the slurry for the insulating layer slurry are evaporated in the drying machine 203. After evaporation of the solvent, the current collector 110 is fed to a roll press where the active material layer 111 and the insulating layer 112 are compression-molded. Thus, the active material layer 111 is formed simultaneously with the formation of the insulating layer 112.

Finally, the current collector 110 is cut into a desired shape by an appropriate method such as punching. The electrode is thereby obtained. The cutting step may be carried out so as to obtain a desired shape by one time of processing or it may be carried out so as to obtain a desired shape by a plurality of times of processing.

Although the present invention has been described with reference to one example embodiment, the present invention is not limited to the above-described example embodiments, and can be arbitrarily changed within the scope of the technical idea of the present invention.

For example, in the above example embodiment, in order to apply the active material layer 111 and the insulating layer 112, a die coater 210 having two die heads 211 and 212 with discharge openings 211a and 212a as shown in FIG. 6 was used. However, as shown in FIG. 6A, the active material layer 111 and the insulating layer 112 can be applied to the current collector 110 by using a die coater 220 having a single die head 221 with two discharge openings 221a and 221b.

The two discharge openings 221a and 221b are arranged at intervals in the rotation direction of the backup roller 201, that is, the feed direction of the current collector 110. The slurry for the active material layer is applied by the discharge opening 221a located on the upstream side in the feed direction of the current collector 110 and the slurry for the insulating layer is applied by the discharge opening 221b located on the downstream side. Therefore, the slurry for the active material layer and the slurry for the insulating layer are discharged respectively from the two discharge openings 221a and 221b, thereby it is possible to obtain a structure that the active material layer 111 is intermittently applied to the surface of the current collector 110 and the insulating layer 112 is applied to the surface of the active material layer 111.

Figure 6B:
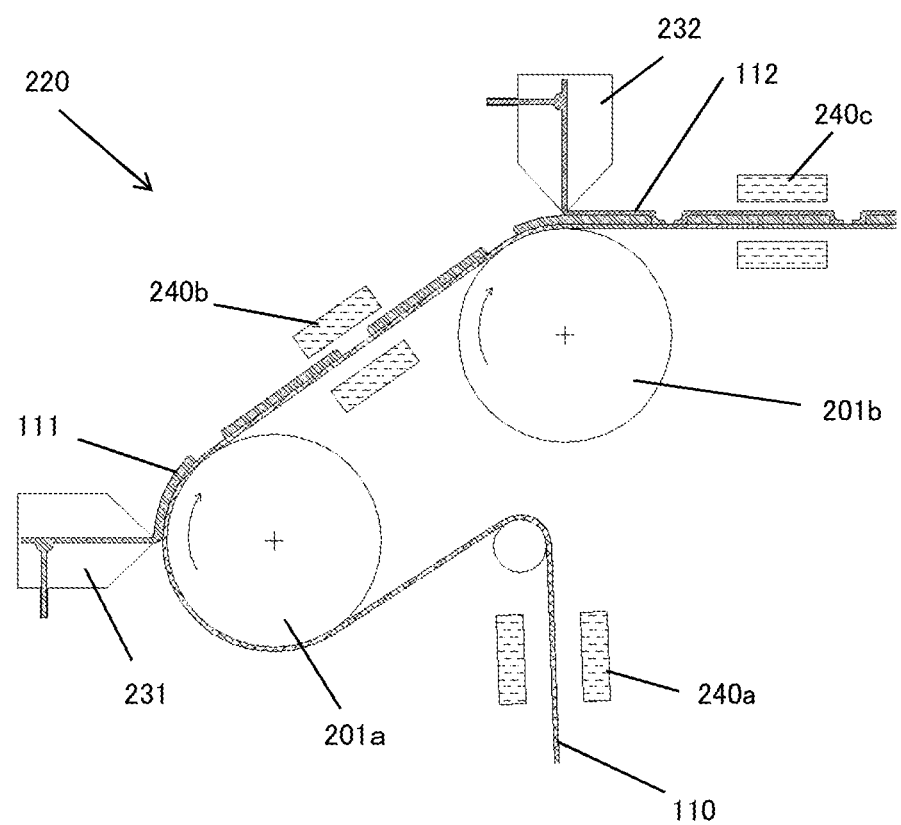
FIG. 6B is a schematic view of another embodiment of the electrode manufacturing apparatus.

As still another form of the die coater, a die coater 220 shown in FIG. 6B also can be used. The die coater 220 shown in FIG. 6B includes a first backup roller 201a and a second backup roller 201b, corresponding to each of which a first die head 231 and a second die head 232 are disposed. The active material layer 111 is applied with the first die head 231, which is located on the upstream side of the carrying direction of the current collector 110, and the insulating layer 112 is applied with the second die head 232, which is located on the downstream side. A structure in which the active material layer 111 is intermittently applied to the surface of the current collector 110 and the insulating layer 112 is applied to the surface of the active material layer 111 can be obtained by also using this configuration.

When the die coater 220 including the plurality of backup rollers 201a and 201b as shown in FIG. 6B is used, it is possible to dispose a first sensor 240a on the upstream side of the first backup roller 201a, a second sensor 240b between the first backup roller 201a and the second backup roller 201b, and a third sensor 240c on the downstream side of the second backup roller 201b, respectively. These sensors 240a, 240b, and 240c are each may be a film thickness gauge, with which it is possible to measure the thickness of the active material layer 111 and the thickness of the insulating layer 112. The thickness of the active material layer 111 can be determined from the difference between the measurement result by the second sensor 240b and the measurement result by the first sensor 240a, and the thickness of the insulating layer 112 can be determined from the difference between the measurement result by the third sensor 240c and the measurement result by the second sensor 240b.

As the film thickness gauge, a known film thickness gauge such as a radiation ($\alpha$ ray, $\gamma$ ray, or X ray) film thickness gauge and a laser film thickness gauge can be used. The film thickness gauge is desirably of a contactless type. Alternatively, as the film thickness gauge, either of a reflection type and a transmission type may be used.

Furthermore, in the example embodiment mentioned above, the case of applying the active material layer 111 and the insulating layer 112 to one surface of the current collector 110 has been explained. It is also possible to manufacture an electrode having the active material layer 111 and the insulating layer 112 on both surfaces of the current collector 110 by applying the active material layer and the insulating layer 112 to the other surface in the same manner. After the active material layer 111 and the insulating layer 112 have been formed on both surfaces of the current collector 110, the current collector 110 is fed to a roll press, where the active material layers 111 and the insulating layers 112 are press formed.

Herein, the electrode and the method for manufacturing the same have been described, wherein the first layer is an active material layer and the second layer is an insulating layer. However, the combination of the first layer and the second layer is not limited thereto.

For example, the first layer may be a highly-adhesive active material layer, in which the amount of the binder has been increased relative to the usual amount, and the second layer may be a high energy density active material layer. With such a layer configuration, it is possible to improve the energy density of the battery while falling off of the active material layer from the current collector is suppressed. When a low resistance active material layer including an increased amount of a conductive material relative to the usual amount or a conductive layer made of a conductive material and a binder is used as the first layer, and a high energy density active material layer is used as the second layer, it is possible improve both the energy density of the battery and the charge and discharge power density.

Further, the battery obtained by the present invention can be used in various uses. Some examples are described below.

[Battery Pack]

A plurality of batteries can be combined to form a battery pack. For example, the battery pack may have a configuration in which two or more batteries according to the present example embodiment are connected in series and/or in parallel. The series number and parallel number of the batteries can be appropriately selected according to the intended voltage and capacity of the battery pack.

[Vehicle]

Figure 7:
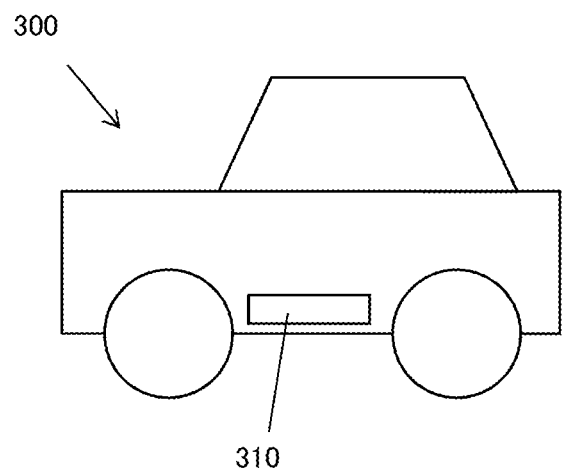
FIG. 7 is a schematic view showing an embodiment of an electric vehicle equipped with a secondary battery.

The above-described battery or the battery pack thereof can be used for a vehicle. Examples of vehicles that can use batteries or assembled batteries include hybrid vehicles, fuel cell vehicles, and electric vehicles (four-wheel vehicles (commercial vehicles such as passenger cars, trucks and buses, and mini-vehicles, etc.), motorcycles (motorbike and tricycles). Note that the vehicle according to the present example embodiment is not limited to an automobile, and the battery can also be used as various power sources for other vehicles, for example, transportations such as electric trains. As an example of such a vehicle, FIG. 7 shows a schematic diagram of an electric vehicle. The electric vehicle 300 shown in FIG. 7 has a battery pack 310 configured to satisfy the required voltage and capacity by connecting a plurality of the above-described batteries in series and in parallel.

[Power Storage Device]

Figure 8:
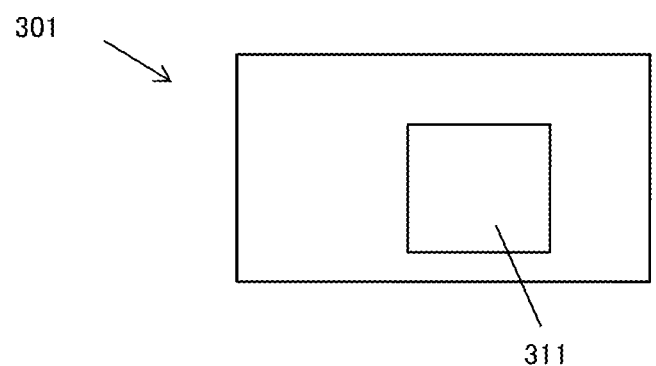
FIG. 8 is a schematic diagram showing an example of a power storage device equipped with a secondary battery.

The above-described battery or the battery pack thereof can be used for a power storage device. Examples of the power storage device using the secondary battery or the battery pack thereof include a power storage device which is connected between a commercial power supply supplied to an ordinary household and a load such as a household electric appliance to use as a backup power source or an auxiliary power source in case of power outage, and a power storage device used for large-scale electric power storage for stabilizing electric power output with large time variation due to renewable energy such as photovoltaic power generation. An example of such a power storage device is schematically shown in FIG. 8. The power storage device 301 shown in FIG. 8 has a battery pack 311 configured to satisfy a required voltage and capacity by connecting a plurality of the above-described batteries in series and in parallel.

[Others]

Furthermore, the above-described battery or the battery pack thereof can be used as a power source of a mobile device such as a mobile phone, a notebook computer and the like.

EXPERIMENT EXAMPLE

Experiment Example 1 (Positive Electrode)

A plurality of simulated positive electrodes in each of which a positive electrode active material layer was formed as a first layer on a current collector and an insulating layer was formed as a second layer on the first layer were produced under several conditions in which the type of a binder or thickener (second thickener) and the composition ratio represented by a mass ratio to be used were different for each insulating layer. Slurries each contained a filler (e.g., in a slurry for the active material layer, an active material or the like, and in a slurry for the insulating layer, non-conductive particles or the like), a binder (thickener), and a solvent. The solid content ratio of the slurry and the composition ratio of the binder (thickener) are calculated by the following expressions:

Solid content ratio of slurry=$(A+B)/(A+B+C)$

Composition ratio of binder(thickener)=$B/(A+B)$ wherein A is the mass of the filler, B is the mass of the binder (thickener), and C is the mass of the solvent. The viscosity measured in this Experiment Example is a viscosity measured at a temperature of 25° C. and a shear rate of 1 (/sec), and for the viscosity measurement, a rotary viscometer, DV-II+Pro from Brookfield Engineering Laboratories was used. The description above also applies to the Experiment Example 2 described below.

<Preparation of Slurry for the Positive Electrode Active Material Layer>

A lithium nickel composite oxide ($LiNi_{0.8}Mn_{0.15}Co_{0.05}O_2$) as a positive electrode active material, carbon black as a conductive auxiliary, and polyvinylidene fluoride (PVdF) as a binder or thickener (first binder or thickener) were measured at a mass ratio of 92:5:3 (the composition ratio of the binder (thickener) was 3 mass %) and kneaded with N-methylpyrrolidone as a solvent to prepare a slurry for the positive electrode active material layer. The solvent was added such that the solid content ratio of the slurry for the positive electrode active material layer was about 70 mass %. The PVdF used had a weight average molecular weight of 1,000,000. A solution in which the PVdF of 10 mass % was dissolved in a solvent had a viscosity (10% solution viscosity) of 78800 mPa·s. It can be said that the PVdF serves as a binder as well as a thickener at the same time.

<Preparation of Slurry for the Insulating Layer>

Alumina (AKP-3000 manufactured by Sumitomo Chemical Co., Ltd.) as non-conductive particles and polyvinylidene fluoride (PVdF) as a binder or thickener (second thickener) were measured at a predetermined mass ratio and kneaded with N-methylpyrrolidone as a solvent to prepare a slurry for the insulating layer. Herein, three binders (thickeners), which gave a viscosity (10% solution viscosity) different from each other by dissolving the binder of 10 mass % in a solvent, were used as binders (thickeners) to provide 14 slurries for the insulating layer 1 to 14, in total, by changing the composition ratio of the binder (thickener) and the solid content ratio of the slurry for each binder (thickener). The viscosity each of the resulting slurries for the insulating layer 1 to 14 was also measured.

<Production of Simulated Positive Electrode>

An aluminum foil having a thickness of 20 m was provided as a current collector. The slurry for the positive electrode active material layer described above was applied onto the aluminum foil, and additionally, the slurry for the insulating layer was applied onto the slurry for the positive electrode active material layer before the slurry for the positive electrode active material layer was dried. The slurries were dried to produce a plurality of simulated positive electrodes. Production of simulated positive electrode was performed on the slurries for the insulating layer 1 to 14 described above. Accordingly, in Experiment Example 1, 14 simulated positive electrodes 1 to 14 were produced.

For application of the slurry for the positive electrode active material layer and the slurry for the insulating layer, a 2-head type die coater having two die heads was used. The amount of the slurry for the positive electrode active material layer applied was set at 10 mg/cm². The amount of the slurry for the insulating layer applied was set at 2 mg/cm².

<Evaluation>

The simulated positive electrodes 1 to 14 produced were evaluated as follows.

(Cracking on Insulating Layer Surface)

When cracking occurs on the insulating layer surface, the insulation property may be reduced depending on the degree of depth and spread.

Then, the presence or absence of occurrence of cracking on the surface of the insulating layer was visually checked. When no occurrence of cracking was observed, the cracking was evaluated as "A", and when occurrence of cracking was observed, the cracking was evaluated as "C".

(Adhesive Force of Insulating Layer)

When the adhesive force between the active material layer and the insulating layer is excessively weak, a short circuit between the positive electrode and the negative electrode may be caused by peeling of the insulating layer from the active material layer. Then, the simulated positive electrode produced was wound around a metal rod having a diameter of 2 mm and drawn through the operator's hands three times, and the adhesive force of the insulating layer was evaluated with respect to the presence or absence of fractures and falling off of the coating film. Specifically, when no fractures and falling off of the coating film occurred, the adhesive force was determined as "A". When cracking or falling off occurred partially on the coating film, the adhesive force was determined as "B". When cracking or falling off occurred entirely on the coating film, the adhesive force was determined as "C".

(Insulation Ratio)

Each simulated positive electrode produced was evaluated for its insulation ratio. The presence or absence of the continuity between the aluminum foil as the lowermost layer and the insulating layer surface as the uppermost layer was checked with a tester at 20 points for each simulated positive electrode. The insulation ratio was a value as the ratio of the number of points where no continuity was confirmed, expressed in a percentage. A higher insulation ratio can indicate that insulation by the insulating layer is achieved, and in contrast, a lower insulation ratio can indicate that an internal short circuit is occurring in many of the points. In the case where cracking was visually observed in the insulating layer, the continuity was checked at 20 point except for the cracked portion.

The major composition of each slurry for the insulating layer used for producing the simulated positive electrodes 1 to 14 and the evaluation results of the simulated positive electrodes produced are shown in Table 1.

The following can be said from Table 1.

(1) A lower 10% solution viscosity of the thickener (second thickener) in the slurry for the insulating layer provided a higher insulation ratio.

(2) When the molecular weight of the second thickener was equal to the molecular weight of the first thickener and the composition ratio of the thickener in the slurry for the insulating layer was smaller, cracking tended to occur on the surface of the insulating layer. It is conceived that this cracking occurred consequently because the high molecular weight of the second thickener led to a reduction in the solid content ratio of the slurry for the insulating layer to thereby raise the shrinkage ratio of the slurry during drying after application and additionally, the relatively small amount of the second thickener led to a relative shortage in the bonding strength.

(3) When the second thickener had a small molecular weight and the composition ratio of the thickener was 2%, the adhesive force tended to decrease. It can be seen from this that the composition ratio of the thickener is preferably higher than 2 mass % from the viewpoint of the adhesion.

(4) When the 10% solution viscosity of the first thickener was made to be higher than the 10% solution viscosity of the second thickener, the insulation ratio increased.

(5) When the solid content ratio in the slurry for the insulating layer was made to be higher than 50 mass % and the composition ratio of the thickener made to be higher than 2 mass %, no cracking occurred on the insulating layer surface and the adhesive force and the insulation ratio were satisfactory.

Experiment Example 2 (Negative Electrode)

A plurality of simulated negative electrodes in each of which a negative electrode active material layer was formed as a first layer on a current collector and an insulating layer was formed as a second layer on the first layer were produced while the preparation conditions of the slurries for the insulating layer each to be used in the insulating layer were changed.

TABLE 1

| Simulated positive electrode | Slurry for insulating layer | | | | | | | |
|---|---|---|---|---|---|---|---|---|
| | 10% solution viscosity (mP · s) | Weight-average molecular weight ($\times 10^4$) | Thickener composition ratio (mass %) | Solid content ratio (mass %) | Viscosity (Pa · s) | Surface cracking | Adhesive force | Insulation ratio (%) |
| 1 | 670 | 35 | 2 | 71 | 120 | A | B | 100 |
| 2 | 670 | 35 | 3 | 69 | 170 | A | A | 100 |
| 3 | 670 | 35 | 5 | 65 | 140 | A | A | 100 |
| 4 | 670 | 35 | 10 | 63 | 140 | A | A | 100 |
| 5 | 8750 | 63 | 2 | 68 | 110 | A | B | 100 |
| 6 | 8750 | 63 | 3 | 67 | 80 | A | A | 100 |
| 7 | 8750 | 63 | 5 | 65 | 100 | A | A | 100 |
| 8 | 8750 | 63 | 10 | 61 | 90 | A | A | 100 |
| 9 | 78800 | 100 | 1 | 56 | 30 | C | A | 100 |
| 10 | 78800 | 100 | 3 | 50 | 100 | C | A | 100 |
| 11 | 78800 | 100 | 5 | 45 | 80 | A | A | 90 |
| 12 | 78800 | 100 | 10 | 31 | 10 | A | A | 70 |
| 13 | 78800 | 100 | 10 | 29 | 4 | A | A | 40 |
| 14 | 78800 | 100 | 10 | 23 | 1 | A | A | 0 |
| (Reference) Positive active material layer | (Slurry for positive active material) | | | | | | | |
| | 78800 | 100 | 3 | 70 | | | | |

<Preparation of Slurry for Negative Electrode Active Material Layer>

A negative electrode active material including silicon oxide ($SiO_2$), graphite, a conductive auxiliary, and a dispersible binder (styrene butadiene rubber: SBR) and carboxymethyl cellulose (CMC) as a thickener (first thickener) were measured at a predetermined mass ratio and kneaded with water as a solvent to prepare a slurry for the negative electrode active material layer. Herein, the solution prepared by dissolving CMC of 1 mass % in water as the first thickener has a viscosity of 8000 mPa·s.

<Preparation of Slurry for the Insulating Layer>

Alumina (AKP-3000 manufactured by Sumitomo Chemical Co., Ltd.) as non-conductive particles and carboxymethyl cellulose (CMC) as a thickener (second thickener) were measured at a predetermined mass ratio and kneaded with water as a solvent to prepare a slurry for the insulating layer. Herein, two second thickeners each having a different degree of etherification were used as CMC, which was the second thickener, to provide two slurries for each thickener, that is, four slurries for the insulating layer 1 to 4 in total, which were prepared by changing the composition ratio of the second thickener and the solid content ratio for each slurry for the insulating layer so as to achieve a target viscosity of 10000 mPa·s. Solutions having each of the two second thickeners used of 1 mass % dissolved in water had viscosities of 1100 mPa·s and of 8000 mPa·s (1% solution viscosity), respectively.

<Preparation of Simulated Negative Electrode>

A copper foil was provided as a current collector. The slurry for the negative electrode active material layer described above was applied onto the copper foil, and additionally, the slurry for the insulating layer was applied onto the slurry for the negative electrode active material layer before the slurry for the negative electrode active material layer was dried. The slurries were dried to produce a plurality of simulated negative electrodes.

Production of the simulated negative electrodes was performed on the slurries for the insulating layer 1 to 4 described above. Accordingly, in Experiment Example 2, four simulated negative electrodes 1 to 4 were produced.

For application of the slurry for the negative electrode active material layer and the slurry for the insulating layer, a 2-head type die coater having two die heads was used. The amount of the slurry for the negative electrode active material layer applied was set at 10 mg/cm². The amount of the slurry for the insulating layer applied was set at 2 mg/cm².

<Evaluation>

The simulated negative electrodes 1 to 4 produced were evaluated for cracking of the insulating layer surface and the adhesive force and insulation ratio of the insulating layer in the same manner as in Experiment Example 1. However, no difference in the insulation ratio among the simulated negative electrodes was observed by checking with a tester, and then, the presence or absence of the continuity was checked at a measurement voltage of 500 V using an ohmmeter. The major composition of each slurry for the insulating layer used for production and the evaluation results of the simulated negative electrode produced, of the simulated negative electrodes 1 to 4 are shown in Table 2.

TABLE 2

| Simulated negative electrode | Slurry for insulating layer | | | Surface cracking | Adhesive force | Insulation ratio (%) |
| --- | --- | --- | --- | --- | --- | --- |
| | 1% solution viscosity (mP·s) | Thickener composition ratio (mass %) | Solid content ratio (mass %) | | | |
| 1 | 1100 | 2 | 41.7 | A | A | 85 |
| 2 | 1100 | 3 | 35.6 | A | A | 70 |
| 3 | 8000 | 2 | 37.1 | A | A | 35 |
| 4 | 8000 | 3 | 30.2 | A | A | 40 |
| (Reference) Negative active material layer | (slurry for negative active material layer) 8000 | | | | | |

The following can be said from Table 2.

(1) With a lower 1% solution viscosity of the thickener (second thickener) used in the slurry for the insulating layer, the solid content ratio of the slurry for the insulating layer could be made higher.

(2) With a lower composition ratio of the thickener of the slurry for the insulating layer, the solid content ratio of the slurry for the insulating layer could be made higher.

(3) When the 1% solution viscosity of the thickener (first thickener) to be used in the slurry for the negative electrode active material layer was made to be higher than the 1% solution viscosity of the second thickener, a sufficiently high insulation ratio was obtained. It is conceived that this is because use of a 1% solution viscosity as described above facilitated drying of the slurry for the insulating layer when the slurry for the active material layer and the slurry for the insulating layer were simultaneously applied to thereby suppress mixing with the slurry for the active material layer.

While the invention has been particularly shown and described with reference to example embodiments thereof, the invention is not limited to these supplementary embodiments and experiment embodiments. It will be understood by those of ordinary skill in the art that various changes in form and details may be made therein without departing from the spirit and scope of the present invention as defined by the claims."

Supplementary Notes

The whole or part of the example embodiments disclosed above can be described as, but not limited to, the following supplementary notes.

(Supplementary note 1) A method for manufacturing an electrode used as a positive electrode and a negative electrode of a secondary battery, the method comprising:

applying a slurry for a first layer to a surface of a current collector;

applying a slurry for a second layer to the slurry for the first layer before the slurry for the first layer is dried; and drying the slurries for the first layer and the second layer after applying the slurries for the first layer and the second layer to obtain a laminated structure in which the first layer and the second layer are laminated in this order on the current collector;

wherein a first binder or thickener for the slurry for the first layer and a second binder or thickener for the slurry for the second layer are selected such that when viscosities are measured for a first solution including solvent and the first binder or thickener dissolved in the solvent in a specific mass ration and a second solution including a solvent and the second binder or thickener dissolved in the solvent at the same mass ration as the mass ration of the first binder or thickener under the same conditions, the viscosity of the first solution is higher than the viscosity of the second solution.

(Supplementary note 2) The method for manufacturing the electrode for the secondary battery according to Supplementary note 1, wherein the viscosities of the slurry for the first layer and the slurry for the second layer are such that the viscosity of the slurry for the first layer is 12000 mPa·s or more and/or the viscosity of the second layer slurry is 4000 mPa·s or more when measured at a shear rate of 1/sec at 25° C., (Supplementary note 3) The method for manufacturing the electrode for the secondary battery according to Supplementary note 1 or 2, wherein the viscosity of the slurry for the second layer is 4000 mPa·s or more and the viscosity of the slurry for the first layer is 5000 mPa·s or more.

(Supplementary note 4) The method for manufacturing the electrode for the secondary battery according to Supplementary note 2 or 3, wherein the viscosities of the slurries for the first layer and the second layer are 50000 mPa·s or more and 200000 mPa·s or less.

(Supplementary note 5) The method for manufacturing the electrode for the secondary battery according to any of Supplementary notes 1 to 4, wherein the slurry for the first layer and/or the slurry for the second layer has a viscosity such that the viscosity measured at a shear rate of 5/sec at 25° C. is not more than half of the viscosity measured at a shear rate of 1/sec at 25° C.

(Supplementary note 6) The method for manufacturing the electrode for the secondary battery according to any of Supplementary notes 1 to 5, wherein the first layer is an active material layer and the second layer is an insulating layer.

(Supplementary note 7) The method for manufacturing the electrode for the secondary battery according to any of Supplementary notes 1 to 5, wherein the first layer is a high adhesion active material layer, a low resistance active material layer or a conductive layer.

(Supplementary note 8) The method for manufacturing the electrode for the secondary battery according to any of Supplementary notes 1 to 7, wherein the slurry for the first layer and the slurry for the second layer include a main material, the binder or thickener, and the solvent.

(Supplementary note 9) The method for manufacturing the electrode for the secondary battery according to Supplementary note 8, wherein the binders or thickeners of the slurry for the first layer and the slurry for the second layer have the same main components.

(Supplementary note 10) The method for manufacturing the electrode for the secondary battery according to Supplementary note 8 or 9, wherein the solvents of the slurry for the first layer and the slurry for the second layer have the same main components.

(Supplementary note 11) The method for manufacturing the electrode for the secondary battery according to any of Supplementary notes 1 to 10, further comprising cooling at least a surface of the slurry for the first layer after applying the slurry for the first layer and before applying the slurry for the second layer.

(Supplementary note 12) The method for manufacturing the electrode for the secondary battery according to any of Supplementary notes 1 to 11, wherein a solid content ratio of the slurry for the second layer is 50 mass % or more.

(Supplementary note 13) The method for manufacturing the electrode for the secondary battery according to any of Supplementary notes 1 to 12, wherein the step of drying the slurries to obtain the laminated structure includes a time within 10 seconds from the completion of coating of the slurry for the second layer to the start of drying of the slurries for the first layer and the second layer.

(Supplementary note 14) The method for manufacturing the electrode for the secondary battery according to any of Supplementary notes 1 to 13, wherein a composition ratio of the second binder or thickener in the slurry for the second layer slurry is higher than 2 mass %.

(Supplementary note 15) A method for manufacturing an electrode used as a positive electrode and a negative electrode of a secondary battery, the method comprising;

applying a slurry for a first layer to a surface of current collector;

applying a slurry for a second layer to the slurry for the first layer before the slurry for the first layer is dried; and drying the slurries for the first layer and the second layer after applying the slurries for the first layer and the second layer to obtain a laminated structure in which the first layer and the second layer are laminated in this order on the current collector;

wherein a molecular weight of a first binder or thickener used in the slurry for the first layer is larger than that of a second binder or thickener used in the slurry for the second layer.

(Supplementary note 16) A method for manufacturing a secondary battery comprising:

manufacturing a positive electrode and a negative electrode by a method according to any of Supplementary notes 1 to 15;

arranging the positive electrode and the negative electrode so as to face each other to constitute a battery element; and enclosing the battery element together with an electrolytic solution in a casing.

INDUSTRIAL APPLICABILITY

The secondary battery according to the present invention can be utilized in, for example, any industrial field where a power source is required and industrial field relating to the transport, storage, and supply of electrical energy. Specifically, it can be utilized for power sources of mobile devices such as cell phones and notebook computers; power sources of movement/transport media such as trains, satellites, and submarines, including electric vehicles such as electric automobiles, hybrid cars, electric motorcycles, and electrically assisted bicycles; backup power sources such as UPSs; power storage facilities that store electric power produced by solar power production, wind power production, and the like; etc.

EXPLANATION OF SYMBOLS

10 Battery element
10a Positive electrode tab
10b Negative electrode tab
11 Positive electrode
12 Negative electrode
13 Separator
31 Positive electrode terminal
32 Negative electrode terminal
110 Current collector
110a Extended portion
111 Active material layer
112 insulating layer

The invention claimed is:

1. A method for manufacturing an electrode used as a positive electrode and a negative electrode of a secondary battery, the method comprising;

applying a slurry for a first layer to a surface of current collector;

applying a slurry for a second layer to the slurry for the first layer before the slurry for the first layer is dried; and drying the slurries for the first layer and the second layer after applying the slurries for the first layer and the second layer to obtain a laminated structure in which the first layer and the second layer are laminated in this order on the current collector;

wherein a molecular weight of a first binder or thickener used in the slurry for the first layer is larger than that of a second binder or thickener used in the slurry for the second layer, and wherein the first layer is an active material layer and the second layer is an insulating layer.

2. A method for manufacturing an electrode used as a positive electrode and a negative electrode of a secondary battery, the method comprising:

applying a slurry for a first layer to a surface of a current collector;

applying a slurry for a second layer to the slurry for the first layer before the slurry for the first layer is dried; and drying the slurries for the first layer and the second layer after applying the slurries for the first layer and the second layer to obtain a laminated structure in which the first layer and the second layer are laminated in this order on the current collector;

wherein a first binder or thickener for the slurry for the first layer and a second binder or thickener for the slurry for the second layer are selected such that when viscosities are measured for a first solution including solvent and the first binder or thickener dissolved in the solvent in a specific mass ratio and a second solution including a solvent and the second binder or thickener dissolved in the solvent at the same mass ratio as the mass ratio of the first binder or thickener under the same conditions, the viscosity of the first solution is higher than the viscosity of the second solution, and wherein the first layer is an active material layer and the second layer is an insulating layer.

3. The method for manufacturing the electrode for the secondary battery according to claim 2, wherein the viscosities of the slurry for the first layer and the slurry for the second layer are such that the viscosity of the slurry for the first layer is 12000 mPas or more and/or the viscosity of the second layer slurry is 4000 mPas more when measured at a shear rate of 1/sec at 25° C.

4. The method for manufacturing the electrode for the secondary battery according to claim 2, wherein the viscosity of the slurry for the second layer is 4000 mPas or more and the viscosity of the slurry for the first layer is 5000 mPas or more.

5. The method for manufacturing the electrode for the secondary battery according to claim 3, wherein the viscosities of the slurries for the first layer and the second layer are 50000 mPas or more and 200000 mPas or less.

6. The method for manufacturing the electrode for the secondary battery according to claim 2, wherein the slurry for the first layer and/or the slurry for the second layer has a viscosity such that the viscosity measured at a shear rate of 5/sec at 25° C. is not more than half of the viscosity measured at a shear rate of 1/sec at 25° C.

7. The method for manufacturing the electrode for the secondary battery according to claim 2, wherein the slurry for the first layer and the slurry for the second layer include a main material, the binder or thickener, and the solvent.

8. The method for manufacturing the electrode for the secondary battery according to claim 7, wherein the binders or thickeners of the slurry for the first layer and the slurry for the second layer have the same main components.

9. The method for manufacturing the electrode for the secondary battery according to claim 7, wherein the solvents of the slurry for the first layer and the slurry for the second layer have the same main components.

10. The method for manufacturing the electrode for the secondary battery according to claim 2, further comprising cooling at least a surface of the slurry for the first layer after applying the slurry for the first layer and before applying the slurry for the second layer.

11. The method for manufacturing the electrode for the secondary battery according to claim 2, wherein a solid content ratio of the slurry for the second layer is 50 mass % or more.

12. The method for manufacturing the electrode for the second battery according to claim 2, wherein the step of drying the slurries to obtain the laminated structure includes a time within 10 seconds from the completion of coating of the slurry for the second layer to the start of drying of the slurries for the first layer and the second layer.

13. The method for manufacturing the electrode for the secondary battery according to claim 2, wherein a composition ratio of the second binder or thickener in the slurry for the second layer slurry is higher than 2 mass %.

14. A method for manufacturing a secondary battery comprising:
   manufacturing a positive electrode and a negative electrode by a method according to claim 2;
   arranging the positive electrode and the negative electrode so as to face each other to constitute a battery element; and
   enclosing the battery element together with an electrolytic solution in a casing.

15. A method for manufacturing a secondary battery comprising:
   manufacturing a positive electrode and a negative electrode by a method according to claim 1;
   arranging the positive electrode and the negative electrode so as to face each other to constitute a battery element; and
   enclosing the battery element together with an electrolytic solution in a casing.

* * * * *